US007334216B2

(12) United States Patent
Molina-Moreno et al.

(10) Patent No.: US 7,334,216 B2
(45) Date of Patent: Feb. 19, 2008

(54) METHOD AND APPARATUS FOR AUTOMATIC GENERATION OF INFORMATION SYSTEM USER INTERFACES

(75) Inventors: Pedro Juan Molina-Moreno, Albacete (ES); Oscar Pastor-Lopez, Valencia (ES); Juan Carlos Molina-Udaeta, Valencia (ES); Jose Miguel Barbera-Alonso, Valencia (ES)

(73) Assignee: Sosy, Inc., San Francisco, CA (US)

( * ) Notice: Subject to any disclaimer, the term of this patent is extended or adjusted under 35 U.S.C. 154(b) by 638 days.

(21) Appl. No.: 10/356,250

(22) Filed: Jan. 31, 2003

(65) Prior Publication Data

US 2004/0153992 A1    Aug. 5, 2004

Related U.S. Application Data

(63) Continuation-in-part of application No. 09/872,413, filed on Jun. 1, 2001, now Pat. No. 7,278,130, which is a continuation-in-part of application No. 09/543,085, filed on Apr. 4, 2000, now Pat. No. 6,681,383.

(51) Int. Cl.
*G06F 9/44* (2006.01)
(52) U.S. Cl. ...................... 717/109; 717/105
(58) Field of Classification Search ................ 717/105, 717/109
See application file for complete search history.

(56) References Cited

U.S. PATENT DOCUMENTS

| | | | |
|---|---|---|---|
| 4,734,854 A | 3/1988 | Afshar | 717/107 |
| 4,841,441 A | 6/1989 | Nixon et al. | 706/45 |

(Continued)

OTHER PUBLICATIONS

Nuno Jardim Nunes, "Object Modeling for User-Centered Development and User-Interface Design", PhD Thesis, Universidad de Madeira, Madeira, Portugal, 2001, retrieved from the Web at //xml.coverpages.org/NunoWisdomThesis.pdf on Aug. 31, 2006.*

(Continued)

*Primary Examiner*—Tuan Dam
*Assistant Examiner*—John J Romano
(74) *Attorney, Agent, or Firm*—Ronald Craig Fish, A Law Corp.; Ron Fish

(57) ABSTRACT

A method and apparatus for the specification and automatic generation of user interfaces of information system (computer programs) is provided. The method is based in pattern language to specify requirements in an un-ambiguous mode and with precise semantics. The pattern language allows a user interface model to be composed using elements of the pattern language (computer objects in the object oriented programming style) which fully specify the desired user interface. The semantics of the objects in the user interface model have one and only one definition such that user interface model can be validated in a validation process. The validation process eliminates bugs in the final computer program code which is automatically produced from the user interface model. A model (metamodel), an editor tool (computer program) implementing the model for creating specifications of the user interface model, DTD specification, code generators, and other artifacts are depicted and described here for obtaining such user interfaces for different platforms (computers and operating systems) and different programming languages without manual coding of the computer code to implement the user interface. The software obtained is ready to run and it is able to communicate with a business server component using a standardized Application Programmatic Interface (API).

20 Claims, 21 Drawing Sheets

U.S. PATENT DOCUMENTS

| | | | | |
|---|---|---|---|---|
| 5,027,305 | A | 6/1991 | Tanaka et al. | 706/48 |
| 5,159,687 | A | 10/1992 | Richburg | 717/106 |
| 5,185,867 | A | 2/1993 | Ito | 717/143 |
| 5,204,939 | A | 4/1993 | Yamazaki et al. | 706/50 |
| 5,371,895 | A | 12/1994 | Bristol | 717/136 |
| 5,459,866 | A | 10/1995 | Akiba et al. | 717/144 |
| 5,481,718 | A * | 1/1996 | Ryu et al. | 719/316 |
| 5,485,601 | A | 1/1996 | Ching | 717/106 |
| 5,495,567 | A * | 2/1996 | Iizawa et al. | 715/762 |
| 5,499,371 | A | 3/1996 | Henninger et al. | 717/108 |
| 5,561,802 | A | 10/1996 | Orimo et al. | 717/136 |
| 5,581,670 | A | 12/1996 | Bier et al. | 715/856 |
| 5,586,329 | A | 12/1996 | Knudsen et al. | 717/108 |
| 5,603,018 | A | 2/1997 | Terada et al. | 712/220 |
| 5,617,114 | A | 4/1997 | Bier et al. | 345/634 |
| 5,640,576 | A | 6/1997 | Kobayashi et al. | 704/9 |
| 5,742,754 | A | 4/1998 | Tse | 714/38 |
| 5,742,827 | A | 4/1998 | Ohkubo et al. | 717/143 |
| 5,758,160 | A | 5/1998 | McInerney et al. | 717/104 |
| 5,790,760 | A | 8/1998 | Arima | 706/45 |
| 5,798,752 | A | 8/1998 | Buxton et al. | 715/863 |
| 5,805,891 | A | 9/1998 | Bizuneh et al. | 717/121 |
| 5,842,205 | A | 11/1998 | Brann | 707/4 |
| 5,878,262 | A | 3/1999 | Shoumura et al. | 717/164 |
| 5,956,725 | A | 9/1999 | Burroughs et al. | 707/101 |
| 5,960,200 | A | 9/1999 | Eager et al. | 395/705 |
| 5,966,534 | A | 10/1999 | Cooke et al. | 717/155 |
| 5,995,736 | A | 11/1999 | Aleksic et al. | 716/18 |
| 6,058,493 | A | 5/2000 | Talley | 714/38 |
| 6,199,195 | B1 | 3/2001 | Goodwin et al. | 717/104 |
| 6,275,976 | B1 | 8/2001 | Scandura | 717/1 |
| 6,289,502 | B1 | 9/2001 | Garland et al. | 717/104 |
| 6,385,765 | B1 | 5/2002 | Cleaveland et al. | 717/100 |
| 6,393,456 | B1 | 5/2002 | Ambler et al. | 709/200 |
| 6,571,232 | B1 | 5/2003 | Goldberg et al. | 707/2 |
| 6,681,383 | B1 | 1/2004 | Iborra et al. | 717/126 |
| 6,850,922 | B1 | 2/2005 | Wason | 706/47 |
| 7,047,488 | B2 * | 5/2006 | Ingersoll et al. | 715/523 |
| 2002/0091990 | A1 * | 7/2002 | Little et al. | 717/105 |
| 2002/0120859 | A1 | 8/2002 | Lipkin et al. | 726/26 |
| 2003/0079180 | A1 | 4/2003 | Cope | 715/511 |
| 2004/0216147 | A1 * | 10/2004 | Yanosy et al. | 719/328 |

OTHER PUBLICATIONS

CHG-881 RU office action dated Jun. 1, 1984.

Letelier, P., et al., "*OASIS Version 3.0; Un Enfoque Formal Para el Modelado Conceptual Orientado a Objectos*" (In Spanish), ISBN: 84-7721-663-0, Legal Diposit: V-3484-1998, Servicio de Publicaciones de la UPV, SP-UPV 98-4011, Valencia, Spain, 1998.

Pelechano, V., "*OO-Method: Implementación de un Entomo Gráfico para el Análisis y Diseño de Sistemas De Información OO*" (In Spanish), Master Thesis, 1994.

Pelechano, V., et al., "*CASE OO-Method: Un Entomo de Producción Automática de Software*" (In Spanish) Actas de la Convenció Informática Latina CIL-95, Barcelona, Jun. 1995.

Romero, J., "*Diseño de un Entomo de Producción de Software basado en el Lenguale de Especificación OASIS y en la utilizacióde PowerBuilder como Herramienta de Desarrollo Gráfica y C/S*" (In Spanish), Master Thesis, Valencia, Mar. 1996, applicants provided summary.

Pastor, O., et al., "*An Object Oriented Methodological Approach for Making Automated Prototyping Feasible*", Database and Expert Systems Applications. Lecture Notes in Computer Science (1134) pp. 29-39 Springer-Verlag, 1996, ISBN: 3-540-61656-x, ISSN: 0302 9743, Zurich (Suisse), applicant summary.

Pelechano, V., et al., "*Implementación y comprobación de restricciones de integridad dinámicas en entornos de programación orientados a objectos*" (In Spanish), II Jornadas Nacionales de Ingeniería de Software, Universidad el País Vasco, San Sebastián, Sep. 3-5, 1997, pp. 101-117.

Pastor, O., et al., "*Linking Object-Oriented Conceptual Modeling with Object-Oriented Implementation in Java*", VIII Conference on Database and Expert Systems Applications, (DEXA'1997), ISGN: 3-540-63478-9, LNCS (1308), Toulouse, France, 1997.

Pastor, O., et al., "*OO-METHOD: An OO Software Production Environment Combining Conventional and Formal Methods*", 9th International Conference on Advanced Information Systems Engineering, (CaiSE'1997) ISGN: 3-540-63107-0, LNCS (1250), Barcelona, Spain, 1997.

Pastor, O., et al., "*Object Oriented Conceptual Modeling Techniques to Design and Implement a Sound and Robust Oracle Environment*" Actas de Oracle OpenWorld 97, Viena (Austria) 7-11 Abstract publicado en Oracle OpenWorld Review p. 36, Apr. 1997.

Romero, J., et al., "*Una Herramienta de Generación Automática de Software*" (In Spanish) In Procs of IDEAS-98—I Workshop Iberoamericano en Ingeniería de Requisitos y Ambientes Software, Porto Alegre, Brasil, Apr. 1998.

Gomez, J., et al., "*The Execution Model: A Component-Based Arquitecture to Generate Software Components from Conceptual Models*" In Procs of International Workshop on Component-based Information Systems Engineering, 10th International Conference on Advanced Information Systems Engineering, CAiSE-98 Pisa (Italia), pp. 87-94, ISSN 1170-487X.

Pastor, O., et al., "*From Object Oriented Conceptual Modeling to Automated Programming in Java*", Conceptual Modeling—ER'98, Lecture Notes in Computer Science (1507), pp. 183 197, Springer-Verlag, 1998, ISBN: 3-540-65189-6, ISSN: 0302-9743, Singapur.

Pastor, O., et al., "*Mapping Aggregation from Object-Oriented Conceptual Modeling to Object Oriented Programming*", In Procs of Third International Conference on Object-Oriented Technology, WOON-98, pp. 59-70, San Petersburgo, Russia, Jul. 1998.

Romero, J., et al., "*Automatic Object-Oriented Visual Programming with OO-METHOD*", Software and Hardware Engineering for the 21th Century, pp. 345-354, World Scientific and Engineering Society Press, ISBN: 960-8052-06-8, Jul. 1999.

Gomez, J., et al., "*From Object-Oriented Conceptual Modeling to Component-Based Development*" Database and Expert Systems Applications, Lecture Notes in Computer Science (1677) pp. 332-341 Springer-Verlag, 1999, ISBN: 3-540-66448-3; ISSN: 0302-9743, Florencia (Italia).

Torres, I., "*Disseny i Implementació d'un Diccionari de Dades per a un Model Conceptual*" (In Valenciano), Master Thesis, 2000, summary.

Pelechano, V., et al., "*An Automatic Code Generation Process for Dynamic Specialization Based on Design Patterns and Formal Techniques*", Actas de la IFIP International Conference on Software: Theory and Practice (ICS-2000), 16th IFIP World Computer Congress, pp. 526 539, Pekin (China), Agosto 2000; ISBN-7-5053-6100-4, Publishing House of Electronics Industry.

Pastor, O., "*The OO Method Approach for Information Systems Modeling: From Object Oriented Conceptual Modeling to Automatic Programming*", Information Systems Journal, Elsevier Science, Oct. 2001, vol. 26/7, pp. 507-534.

Molina, P., "*Especificación, de Interfaz de Usuario en OO-Method*" (In Spanish) Master Thesis, Sep. 1998, DSIC/UPV, Valencia, Spain, summary.

Insfrán, E., et al., "*Ingeniería de Requisitos aplicada al modelado conceptual de interfax de usuario*" (In Spanish), In Procs. Of IDEAS'2001, Santo Domingo, Heredia, Costa Rica, CIT, pp. 181-192, Apr. 2001, summary.

Molina, P., et al., "*Specifying Conceptual Interface Patterns in an Object-Oriented Method with Code Generation*", In Proceedings of User Interfaces for Data Intensive Systems, UIDIS'2001, Zurich, Switzerland, IEEE Computer Society, pp. 72-79, Mary, 2001.

Molina, P., et al., "*Prototipado rápido de interfaces de usuario*", (In Spanish), In Procs. Of IDEAS'2002, La Habana, Cuba, pp. 78-90, Apr. 2002, summary.

Molina, P., et al., "*JUST-UI: A User Interface Specification Model*" In Computer-Aided Design of User Interfaces III, Proceedings of the 4th International Conference on Computer-Aided Design of User Interfaces CADUI'2002, Kluwer Academics Publisher, Dordrecht, pp. 63-74, Valenciennes, France, May 2002.

Molina, P., et al., "*User Interface Conceptual Patterns*", In Proceedings of the 4th International Workshop on Design Specification & Verification of Information Systems DSV-IS'2002, Rostock, Germany, pp. 201-214, Jun. 2002.

*Ingenieria de requisitos aplicada al modelado conceptual de interfacz de usuario*, Apr. 3, 2001 [insfran01mp].

Pedro J. Molina, Oscar Pastor, Sofía Martí, Juan J. Fons and, Emilio Insfrán. "Specifying Conceptual Interface Patterns in an Object-Oriented Method with Code Generation" In Proceedings of 2nd IEEE Workshop on User Interfaces for Data Intensive Systems UIDIS'01. IEEE Computer Society, IEEE Press, ISBN 0-7695-0834-0, pp. 72-79, May 2001.

Pedro J. Molina, Santiago Meliá and Oscar Pastor, "Just-UI: A User Interface Specification Model", Computer-Aided Design of User Interfaces III, In Proceedings of the 4th International Conference on Computer-Aided Design of User Interfaces CADUI'2002, Valenciennes, France, Kluwer Academics Publisher, Dordrecht, chapter 5, pp. 63-74, ISBN 1-4020-0643-8, 2002.

Pedro J. Molina, Santiago Meliá and Oscar Pastor, "User Interface Conceptual Patterns", Design, Specification, and Verification of Interactive Systems, In Proceedings of the 4th International Workshop on Design Specification & Verification of Information Systems, DSV-IS'2002, Louvain-La-Neuve, Belguim and Germany, pp. 201-214, 2002. Also in Lecture Notes in Computer Sciences, Springer Verlag, vol. 2545.

Angel R. Puerta and David Maulsby, "Management of interface design knowledge with MOBI-D" In Proceedings of the 2nd international conference on Intelligent user interfaces, IUI'1997 (Orlando, Florida, EE.UU.), pp. 249-252, New York, USA, ACM Press, ISBN 0-89791-839-8, 1997.

François Bodart and Jean Vanderdonckt, "Towards a Systematic Building of Software Architectures: the TRIDENT Methodological Guide", In Proceedings of Design, Specification and Verification of Interactive Systems, DSV-IS'95, pp. 262-278, Springer-Verlag, 1995.

Object Management Group, "UMl Notation. Version 1.1, document OMG ad/97-08-05", 1997.

James Rumbaugh, Michael Blaha, William Premerlani, Frederick Eddy, William Lorenson, "Object-Oriented Modeling and Design". Prentice Hall, ISBN 0136298419, 1990.

Genera, "Genova 7.0", Available at http://www.genera.no/2052/tilkunde/09.04/default.asp, 2004.

Paulo Pinheiro da Silva and Norman W. Paton, "A UML-Based Design Environment for Interactive Applications", In Proceedings of 2nd IEEE Workshop on User Interfaces for Data Intensive Systems UIDIS'01, pp. 60-71, IEEE Computer Society, 2001.

Nuno Jardim Nunes, "Object Modeling for User-Centered Development and User-Interface Design", PhD Thesis, Universidad de Madeira, Madeira, Portugal, 2001.

Fabio Paternò, "Model-Based Design and Evaluation of Interactive Applications", Springer-Verlag, 2000.

Dave Roberts, D. Berry, S. Isensee and J. Mullaly, "Designing for the User with OVID: Bridging User Interface Design and Software Engineering", New Riders Publishing, 1998.

Jean Vanderdonckt and François Bodart, "Encapsulating Knowledge for Intelligent Automatic Interaction Objects Selection", ACM Proc. of the Conf. on Human Factors in Computing Systems INTERCHI'93, Amsterdam, Holland, ACM Press, pp. 424-429,1993.

P.J. Barclay, T. Griffiths, J. McKirdy, N.W. Paton, R. Cooper, and J. Kennedy (1999). "The Teallach Tool: Using Models for Flexible User Interface Design" In Proceedings of CADUI'99. pp. 139-158, Kluwer Academic Publishers, 1999.

OMG. UML Notation. Version 1.1, OMG document ad/97-08-05, Sep. 1997.

OMG. UML Semantics. Version 1.1, OMG document ad/97-08-04, Sep. 1997.

Tim Bray, Jean Paoli, C. M. Sperberg-McQueen, Eve Maler. Extensible Markup Language (XML) 1.0 (Second Edition) W3C Recommendation, World Wide Web Consortium Oct. 6, 2000. http://www.w3.org/TR/REC-xml.

CHG-001 office actions dated May 25, 2001, Apr. 4, 2003, Oct. 23, 2002.

PCT and foreign counterparts of CHG-001 IPER dated Jul. 3, 2003 and intenrnational search report dated Jun. 13, 2002.

CHG-001.1P office actions dated Oct. 7, 2004; Jun. 7, 2005, Feb. 26, 2004 and Feb. 2, 2005.

CHG-001.2P office actions dated Apr. 25, 2005, Aug. 16, 2004 and Apr. 22, 2004.

CHG-001.3P office action dated Jul. 9, 2004, Jan. 26, 2005 and Jul. 14, 2005.

\* cited by examiner

Customer

Customer: 1074

| | |
|---|---|
| Code: | 1074 |
| Name: | Pablo |
| Surname: | Molina |
| Address: | Gran Via, 16. |
| Phone: | 967267777 |
| Fax: | 967267778 |
| Province: | Albacete |
| Country: | Spain |
| Comments: | VIP customer. Special fare. |

--> Curency   --> Payments   --> Orders   --> Invoices

Close

~702

Expense Accounts 11:34a (ok)

Look for Expense Account ⊗

Expense Account: 11

| Field | Value |
|---|---|
| Creation date | 12/04/2002 |
| Description | Description 1 |
| Project title | Title 1 |
| Employee first name | José |
| Employee surname | Ruíz Villambrosa |
| Approved | No |
| Approval date | 15/04/2002 |
| Advance payment | 0 |
| Balance | 0 |
| Total | 0 |
| Paid | Yes |

○ Ready

Acti n

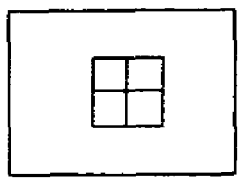 DISPLAY SET ~2000
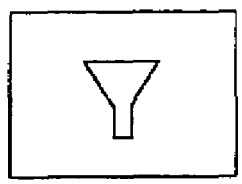 FILTER ~2001
 ORDER CRITERION ~2002
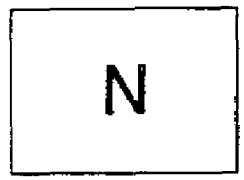 NAVIGATION ~2003
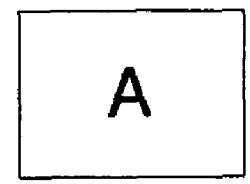 ACTIONS ~2004
FIG. 20

DIALOG TO GIVE A PATTERN A NAME & ALIAS & OTHER INFO

DIALOG TO ARTICULATE A POPULATION IU

DEFINITION TAB FOR FILTERS

DIALOG THAT APPEARS WHEN A DEPENDENCY PATTERN IS SELECTED

METHOD AND APPARATUS FOR AUTOMATIC GENERATION OF INFORMATION SYSTEM USER INTERFACES

CROSS REFERENCE TO RELATED APPLICATIONS

This is a continuation-in-part of a prior U.S. patent application entitled Automatic Software Production System, Ser. No. 09/872,413, filed Jun. 1, 2001, now U.S. Pat. No. 7,278,130 which was a continuation-in-part of prior U.S. patent application of the same title, Ser. No. 09/543,085, filed Apr. 4, 2000 (now U.S. Pat. No. 6,681,383, issued Jan 1, 2004) which are hereby incorporated by reference. Two other CIPS of 09/543,085, filed Apr. 4, 2000 exist having Ser. Nos. 09/872,087 (filed Jun. 1, 2001, now abandoned in favor of a divisional application Ser. No. 10/877,492, which is currently pending and published as US-2004-0233232-A1 on Nov. 25, 2004) and 09/872,333, filed Jun. 1, 2001 issued as U.S. Pat. No. 7,137,100 on Nov. 14, 2006.

REFERENCES

Pedro J. Molina, Oscar Pastor, Sofia Marti, Juan J. Fons and, Emilio Insfrán. "Specifying Conceptual Interface Patterns in an Object-Oriented Method with Code Generation" In Proceedings of 2nd IEEE Workshop on User Interfaces for Data Intensive Systems UIDIS'01. IEEE Computer Society, IEEE Press, ISBN 0-7695-0834-0, pages 72-79, May 2001.

Pedro J. Molina, Santiago Meliá and Oscar Pastor, "Just-UI: A User Interface Specification Model", Computer-Aided Design of User Interfaces III, In Proceedings of the 4th International Conference on Computer-Aided Design of User Interfaces CADUI'2002, Valenciennes, France, Kluwer Academics Publisher, Dordrecht, chapter 5, pages 63-74, ISBN 1-4020-0643-8, 2002.

Pedro J. Molina, Santiago Meliá and Oscar Pastor, "User Interface Conceptual Patterns", Design, Specification, and Verification of Interactive Systems, In Proceedings of the 4th International Workshop on Design Specification & Verification of Information Systems, DSV-IS'2002, Louvain-La-Neuve, Belgium and Germany, pages 201-214, 2002. Also in Lecture Notes in Computer Sciences, Springer Verlag, Vol. 2545.

OTHER REFERENCES

Angel R. Puerta and David Maulsby, "Management of interface design knowledge with MOBID" In Proceedings of the 2nd international conference on Intelligent user interfaces, IUI'1997 (Orlando, Fla., EE.UU.), pages 249-252, New York, USA, ACM Press, ISBN 0-89791-839-8, 1997.

François Bodart and Jean Vanderdonckt, "Towards a Systematic Building of Software Architectures: the TRIDENT Methodological Guide", In Proceedings of Design, Specification and Verification of Interactive Systems, DSV-IS'95, pages 262-278, Springer-Verlag, 1995.

Object Management Group, "UML Notation. Version 1.1, document OMG ad/97-08-05", 1997.

James Rumbaugh, Michael Blaha, William Premerlani, Frederick Eddy, William Lorenson, "Object-Oriented Modeling and Design". Prentice Hall, ISBN 0136298419, 1990.

Genera, "Genova 7.0", [Available at http://www.genera.no/2052/tilkunde/09.04/default.asp]

Paulo Pinheiro da Silva and Norman W. Paton, "A UML-Based Design Environment for Interactive Applications", In Proceedings of 2nd IEEE Workshop on User Interfaces for Data Intensive Systems UIDIS'01, pages 60-71, IEEE Computer Society, 2001.

Nuno Jardim Nunes, "Object Modeling for User-Centered Development and User-Interface Design", PhD Thesis, Universidad de Madeira, Madeira, Portugal, 2001.

Fabio Paternó, "Model-Based Design and Evaluation of Interactive Applications", Springer-Verlag, 2000.

Dave Roberts, D. Berry, S. Isensee and J. Mullaly, "Designing for the User with OVID: Bridging User Interface Design and Software Engineering", New Riders Publishing, 1998.

Jean Vanderdonckt and Franqois Bodart, "Encapsulating Knowledge for Intelligent Automatic Interaction Objects Selection", ACM Proc. of the Conf. on Human Factors in Computing Systems INTERCHI'93, Amsterdam, Holland, ACM Press, pages 424-429,1993.

P. J. Barclay, T. Griffiths, J. McKirdy, N. W. Paton, R. Cooper, and J. Kennedy (1999). "The Teallach Tool: Using Models for Flexible User Interface Design" In Proceedings of CADUI'99. pp 139-158, Kluwer Academic Publishers, 1999.

OMG. UML Notation. Version 1.1, OMG document ad/97-08-05, September 1997.

OMG. UML Semantics. Version 1.1, OMG document ad/97-08-04, September 1997. Tim Bray, Jean Paoli, C. M. Sperberg-McQueen, Eve Maler. Extensible Markup Language (XML) 1.0 (Second Edition) W3C Recommendation, World Wide Web Consortium 6 Oct. 2000. [http://www.w3.org/TR/REC-xml]

COMPUTER PROGRAM LISTING APPENDIX

A pair of identical CD-R compact discs, each containing an assembly code listing in Microsoft Word format having the file name ASM.TXT.DOC and a size of 40.1 MB is appended hereto and incorporated by reference. This file was created on Jan. 31, 2003 and is submitted in duplicate. The disc is compatible with IBM PC/AT, Windows and Macintosh operating systems.

BACKGROUND OF THE INVENTION

The invention pertains to the user interface and software engineering fields. More specifically, it is an apparatus and a method for building user interface for business applications and information systems. To simplify and speed up the process of writing computer code which implements user interfaces for business and other application programs, what is needed is a specific set of primitives that implements a set of patterns which can be used to fully define types of user interfaces for at least business applications. What is needed is a set of primitives and an editor tool by which the user interface can be specified using a model, validated with the user, verified for completeness and non ambiguity, and automatically transformed into source code in a third generation programming language so as to output working computer code implementing such a user interface being able to communicate with a business logic component, responsible of implementing the functionality of the application for which the user interface is the "front end".

The problems with prior art User Interface (UI) models and code generation tools are the following:

UI specification methods do not consider enough the domain model (the functionality of the application). Examples of such deficient UI model and code generation tools are: MOBI-D, TRIDENT, CTT. In other words, these prior art UI modeling tools assume that the business logic will be fully specified apart from the user interface and coded manually. Coding the business logic separately may lead to bugs in integration with the UI and bugs in the business logic code itself. This lengthens the delay from conception to first sales in the market (time to market) because of possibility long delays in debugging the business logic code. Furthermore, this prior art UI specification toots do not have: a precise, unambiguous semantics which can be validated to eliminate bugs in the IU code, that can generate IU code automatically from the validated specification of the user interface and able to connect with a generated business logic component and persistence layer also generated to conform an entirely automatic generated application.

On the other hand, methods and notations for the specification of functional requirements of computer programs (tools to define models of the business logic of a program) such as OMT or UML do not consider user interface requirements as well. This situation leads to a state in which two models are needed to fully specify the business logic and user interface of a computer program (one for the functionality and the other one for the user interface). This produces synchronization problems whenever one of the specification changes. In other words, when one of the specifications changes, the other specification "breaks" and code written implementing this other specification will no longer work with the code written implementing the first specification. This requires expensive and time consuming reworking of the second specification.

UI generation tools like Genova, TRIDENT, SEGUIA, MOBI-D produce partial code where the UI code generated is not complete. Such code cannot be compiled directly and needs hand coding before a program which can run as a final application exists.

Previous UI modeling tools do not present a set of primitives that can be invoked to specif the elements of a user interface for business applications. Teallach, iUML and CTT present a good set of primitives that can be used for user interfaces for programs that address academic problems and theorization. However, these prior art tools propose very low level primitives that can not be used in medium-sized industrial projects without suffering scalability problems. Academic research about UI modeling tools such as iUML, Wisdom or CTT has resulted in tools which have not been tested in industrial projects and has not been fine-tuned for such scalability requirements.

Some notations like OVID and UML lack of precise semantic meaning in the concepts used. As a result, this makes it impossible to generate validated specifications of the user interface model and bug-free code from an imprecise specification.

BRIEF SUMMARY OF THE INVENTION

According to the teachings of the invention, there is provided a method and apparatus for producing fully functional user interface program code for computer programs and other information systems with modeling tools and time savings from concept to working code heretofore unknown.

The overall genus of invention is defined by a software production system based on models, all species of which have the following characteristics:

(1) The software production system contains a unique specification model to facilitate modeling both functional and user interface thereby enabling the production of a single model which fully specifies both the business logic and the user interface (as well as other things) thereby eliminating the synchronization problem between functional and user interfaces requirements that existed in the prior art.

(2) The software production system is supported by a meta-model having among other things, a set of specific primitives called Interaction Units to specify user interfaces for information systems and business applications in a robust and scalable way. Patterns are the templates or building blocks from the meta-model that are used to define a user interface in a shorthand sort of way. The building blocks in the meta-model are patterns of user interfaces that have been identified as common user interface patterns in the prior art. The allowable patterns for specifying a user interface were defined at pattern definition time when the meta-model building blocks to build user interfaces were first defined. In other words, to define means to say what is allowable as a pattern for a user interface type or behavior. To "apply" means to actually select a pattern from the meta-model and articulate it to define some aspect of a user interface. To articulate a pattern means to fill in required data to define its behavior or the content of what will be displayed in the user interlace that results. Some of these patterns are called Interaction Units (hereafter IU), each of which defines a particular type of desired user interlace. Some of these patterns are called elemental patterns and they can be "applied" to a particular Interaction Unit. This allows the analyst building the User Interlace Model from these primitives to enter data to control how the end user can interact with the user interlace, how the user interlace will look and how entry of arguments by the end user will be constrained and to control what attribute data from the classes will be displayed. Interaction Units like Population IU are patterns, but they too have other mandatory or optional elemental patterns applied to them like filter conditions and the other patterns in FIG. 3 at the most detailed level of the HAT tree. These elemental patterns are primitives in the meta-model and define patterns which can be used to elicit data from an analyst to specify data that controls how the user interlace looks, behaves and the content of the displays created by the user interlace. In other words an IU can be applied using an editor program to specify a user interlace and more elemental patterns can be applied to the applied IU and data entered to articulate the IU behavior and content.

(3) The software production system contains an editor which displays ways to invoke the various primitives in the meta-model and add defining characteristics, attributes, values, and relationships to other objects in a model of the desired software program which fully specifies the user interlace as part of the overall model of the program to be generated and which provides a user the capability to edit such a model so as to easily change the model thereby easily changing the resulting code which ultimately be generated from the model. More specifically, with regard to the building of a user interlace in the end result code, the editor provide shortcuts to the analyst. These shortcuts allow an analyst to select a class and then, simply by selecting an icon or menu choice for a particular type of IU, specify the type of user interlace for display of data from the class and for interaction with the user. Then, the computer running the editor responds by opening one or more dialog boxes or forms that invite the analyst to enter data to articulate the IU. Articulation of an IU means that the analyst enters data that controls how the user interface created by selection of the IU will behave in terms of: constraints on entering of arguments by the end user; showing of labels or aliases that provide nicknames for selected or displayed items to provide feedback to the user to verify she picked the right item; dependencies or event-condition-action rules that control the dynamic behavior of the user interface such as when a user enters a certain argument in a service, that will be an event that, if a certain condition exists, will cause an action to be carried out to change the value of another argument; status recovery to recover the current state of an object and display if to a user who want to execute a service to change the value of one or more attributes of an object; filter conditions that control which instances of a class are displayed in a user interface specified by a Population IU; order criterion that control the order of displayed instances of a class in ascending or descending order, etc.; the display set that defines the set of attributes of instances of a class that will be displayed in Population and Instance IU; data that defines actions that, when invoked in the final user interface code by the end user, vector the execution to other user interface code that was created by a target IU specified when the action elemental pattern was applied which causes a change in the displayed data; and navigation pattern data, which causes display in the final user interface of navigation buttons or links that can be invoked by the final user to cause vectoring of processing to code that was generated from a target IU that was specified when the navigation pattern was articulated in the modelling stage. This causes the data displayed on the user interface to be controlled by the code generated by the target IU specified in the navigation pattern.

(4) The software production system contains a validator capable of checking the integrity of such a model built using the editor and including validation of the formal language specification of the user interface against predetermined rules which, if all are complied with, cause the formal language specification to be complete and correct and not ambiguous. In other words, the validator works on the specification of the model built by the editor and verifies that it is complete, correct and unambiguous.

(5) The software production system contains a set of automatic code generator programs capable of translating the validated formal language specification into source code. Such source code is 100% complete and bug-free code which is ready to run.

Interaction Units (IUs) are of various types and represent templates that define particular styles of user interface display and operation. Each Interaction Unit is a template of an object in the object oriented programming sense (hereafter just referred to as objects). Each object will have a data structure which contains data which defines the state of the object and methods or function calls or algorithms that control a computer to operate on the data structure to change the state of the object. Every object has a messaging mechanism to communicate with other objects. The editor contains executable code which implement objects with services or functions to create, edit and destroy the patterns in the meta-model such as IU to allow an analyst to build a User Interface Model which completely defines the desired user interface. The patterns such as IU specified in the User Interface Model are converted by the editor into a data structure defined in Section C hereof which embodies a specification in a formal language of the desired user interface. This formal specification is then validated against the predetermined validation rules based upon the semantics and syntax of the formal language being used. This process points out any fatal errors and gives warning messages regarding non fatal errors. Corrections can then be made with the editor. After validation, the formal language specification is then automatically translated into working, bug-free code. This process happens about much faster than hand writing of code to implement a user interface because of the elimination of large amounts of debugging time.

The IU templates and the other patterns for user interface specification in the meta-model are distilled from the prior art of user interfaces, and each Interaction Unit represents a particular type of user interface. For example, it is common to have a user interface which displays of list of items and data about each item. For example, in a golf tournament management program, one such user interface might be a display of just those players that have entered the tournament who are professional golfers with a handicap below some particular value. With respect to each such golfer, it is desired to have displayed the player's name, his address, phone number and handicap. What is new here is not the user interface comprised of a list of items with data about each item, but the fact that: 1) such a user interface display can be easily specified using a Population IU by having the analyst invoke a population IU icon or menu selection; 2) the computer under the control of the modeler program will then display dialog boxes which the analyst can interact with and fill in data defining filter conditions, e.g., to filter which players to display in the list, order criterion, e.g., to determine the order in which the players are displayed, specify a display set which defines which attributes (e.g., name, address, phone number) of each instance (e.g., player selected per the specified filter condition) of the selected class (e.g., players that have registered in the tournament), the actions (redirections to other IUs), and navigations, e.g., in an invoice population IU, the user selects one invoice and navigates to a lines population IU. As a result, only the lines belonging to such a selected invoice are presented.

Such a user interface can be easily implemented using a Population IU using the methods, data structures and apparatus of the invention. Basically, what happens, for example, is the analyst selects a population IU to display a filtered list of items and fills in the displayed dialog box to specify all the elemental pattern data needed for a population IU such as filter condition, order criterion, display set, actions and navigations. This population IU then creates a template in the form of a data structure and statements in the formal specification that define the desired user interface. After the formal specification is validated, the translator will convert it into compilable code which, when compiled, loaded and executed will control the computer to implement the desired interface. For example, the compiled code at run time will go to the class players, select instances of that class according to the specified filter condition, i.e., players which are professionals, and select the desired attributes for each player according to the specified display set (name, address and phone number). Suppose an action was defined to specify that the user should be able to select a displayed player and jump to a population IU that displays all the scorecards the player filed after playing a round on a particular course. If so, an action button or menu item will be displayed by the computer which, when invoked by the end user of the program, will cause the computer to jump to the code which implements the population IU that displays all the designated scorecards. Suppose a navigation was defined which allows a player to be selected and when a navigation icon named "sponsors" is selected, the user is supposed to be taken to a list of all the player's sponsors like Wilson, Ping, etc. That portion of the population IU specification will cause code to be generated which displays a "sponsors" navigation button, monitors for the selection of the button, and, when selected, vectors processing to the code which implements a population IU which displays all the sponsors of the player.

The primitives and concepts of the specification model (the model built with the editor tool which is specific to solving the problem the software program is supposed to solve) are described in terms of a meta-model. In the preferred embodiment XML is used to store the specification. However, others technologies like textual formal languages, binary files, relational databases, repositories or program language structures are other technological forms to implement the meta-model.

The user of the editor (henceforward referred as analyst) builds models instantiating the meta-model in order to create specifications. Once the specification is built, it is validated to check for completeness (all information needed is present) and non-ambiguity (non-contradictory requirements). When the specification passes the validation process, it can be used as input for code generators to automatically produce source code for user interfaces.

The generators load the specification in memory, apply an inference process to complete the missing information in the specification and automatically produces source code for a given platform and language.

The method described and implemented by the apparatus allows the analyst to develop business software faster that third party tools and methods.

BRIEF DESCRIPTION OF THE SEVERAL VIEWS OF THE DRAWING

FIG. 5 contains three implementation examples of running Service Interaction Unit.

FIG. 7 contains two implementation examples of running Instance Interaction Unit.

FIG. 9 contains three implementation examples of running Population Interaction Unit.

FIG. 20 shows the primitives for graphical notation of level 3.

DETAILED DESCRIPTION OF THE INVENTION

The invention improves an automatic software production system as described in a United States patent application entitled Automatic Software Production System, filed Apr. 4, 2000, Ser. No. 09/543,085, (now U.S. Pat. No. 6,681,383, issued Jan. 20, 2004) and three continuation-in-part of the same title all filed on June 1, 2001, and having Ser. No. 09/872,413, (currently allowed but not yet issued), 09/872,087, (filed Jun. 1, 2001, now abandoned in favor of a divisional application Ser. No. 10/877,492, which is currently pending and published as US-2004-0233232-A1 on Nov. 25, 2004) and 09/872,333, issued as U.S. Pat. No. 7,137,100 on Nov. 14, 2006, respectively, all of which describe systems to automatically produce robust and fully functional business applications from specifications and all of which are hereby incorporated by reference.

Figure 1:
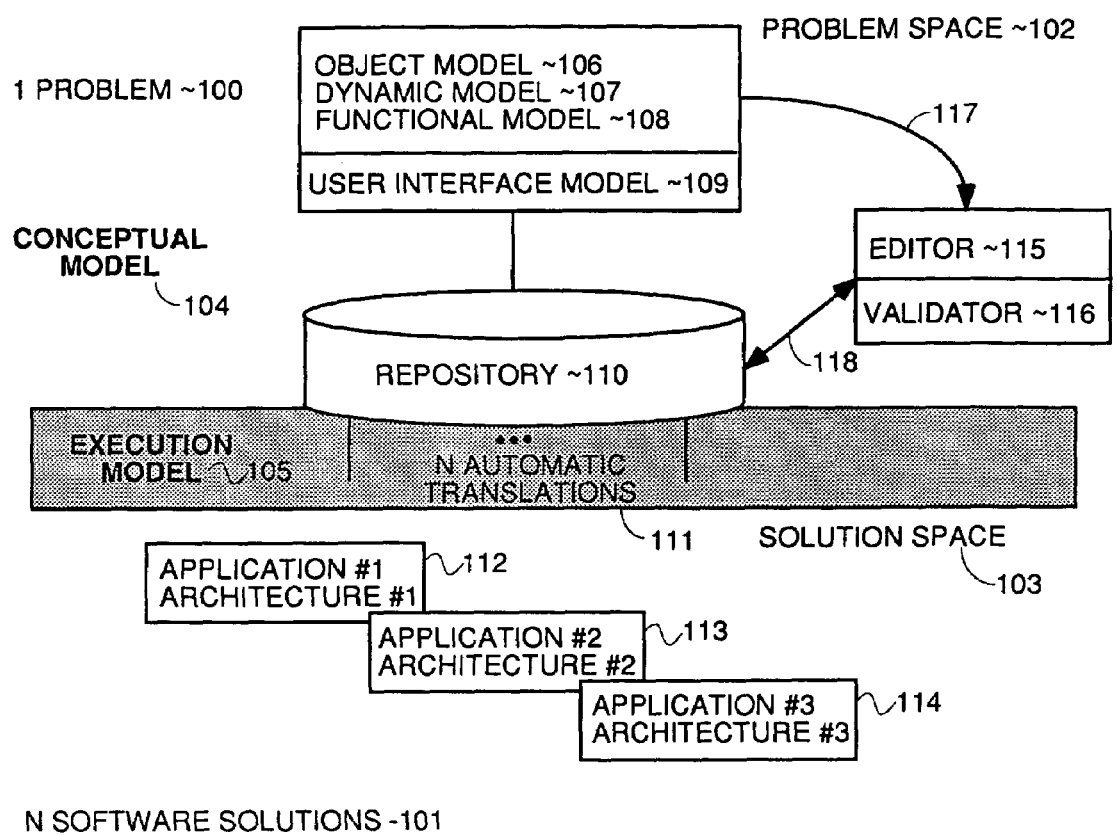
FIG. 1 is a general overview of the process followed. Requirements are expressed in a Conceptual Model, validated and stored in a repository, and later used as input for code generators.

Referring to FIG. 1 there is shown a block diagram describing an overview of the software development process. A given problem 100 can be implemented in many ways 101 taking different analysis, design and implementation decisions. The abstraction separation between the analysis and the implementation is called Problem Space 102 and Solution Space 103, respectively. In this scenario, the Conceptual Model 104 is a set of graphical objects defining the desired behavior of various aspects of the code such as an Object Model 106, a Dynamic Model 107, a Functional Model 108 and a User Interface model 109, which, taken together, specify the requirements of the program or system to be written. A specification in a formal language is built using the Conceptual Model 104 and can, after validation, be translated to an implementation (working code) following the rules described in an Execution Model 105. The Object Model 106, Dynamic Model 107 and Functional Model 108 are used to describe the structural and functional requirements of the program or system to be written. The User Interface Model 109 is introduced to complement the specification with user interface requirements which define the mechanism by which the user will receive information from the program to be built and will provide information to it. The models in the Conceptual Model 104 are built by users (henceforward called analysts) using an Editor 115 (also called Modeler) specifically built to allow construction of (represented by path 117) the models 106, 107, 108 and 109 in the conceptual Model. In other words, editor 115 has tools, icons, menu choices, dialog boxes, etc. by which the various building blocks in a meta-model from which al conceptual Models are built can be selected and put into the Conceptual Model. The Editor also allows the attributes of the objects in the Conceptual Model to be defined and the relationships between objects in the Conceptual Model to be defined. Objects as that term, is used herein means objects in the object oriented computer programming sense. Each object has a data structure, procedures or programs that work on the data structure and a mechanism for translating messages.

Once the Conceptual Model is built, it is translated into a specification in a formal language (hereafter referred to as formal specification or just a specification) such OASIS, but any formal language can be used. Use of a formal language is important because it eliminates ambiguity since there are rules of grammar (syntax plus semantics) which can be used to validate the specification to make sure it is complete and correct.

The formal specifications can be stored 118 in a Repository 110 (computer memory or hard disk) that can be a relational database, a binary file, or any other binary representation of the information. The preferred embodiment is an XML form that will be described later.

The formal specification is validated by a validator 116 in order to check completeness, correctness and non-ambiguity, and this validation process is what the code will be bug free when it is automatically created by a translator. This would not be possible if the specification were not written in a formal language with strict, non-variable rules of syntax and semantics. It is through use of these rules of grammar of the formal language that the declaration in the formal specification can be checked to make sure every statement is complete, correct and non-ambiguous. Once, it is clear that every statement in the formal specification is complete, correct and non-ambiguous, the resulting code will be bug free. In other words, if the specification is valid, it can be used as input for code generators or automatic translators 111 that implement the Execution Model 105 in order to produce applications for any of several languages and/or platforms 112, 113 and 114 like Visual Basic/Windows, Java Swing/Java MV, ColdFusion MX/Web apps, JSP/Web apps.

Figure 2:
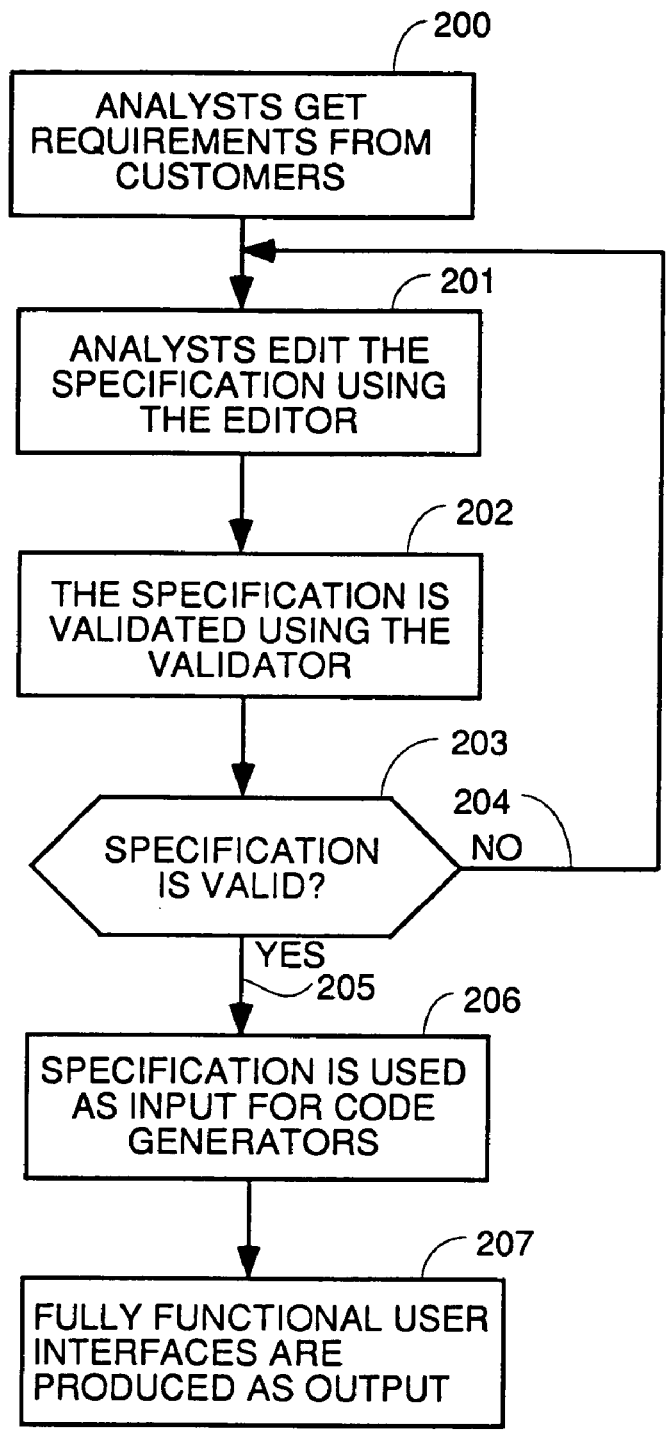
FIG. 2 is a flow chart showing the steps in the production of applications using the editor, validator, and code generators.

The general software production process is shown in the FIG. 2. Analysts talk with customers to gather the requirements 200. Next, analysts use the Editor to build a specification 201. The formal specification is actually built graphically through the use of editor tools such that the analyst essentially draws a picture of the software to be built, and that picture is translated by the editor into declarations in a formal language in the formal specification. The specification is validated 202 using the Validator and the rules of grammar of the formal language. Depending of the result of the validation process 203 different actions must be taken. If the specification is not valid 204, analyst must change the specification returning to 201. When the specification is valid 205, it can be used as input for code generators 206. As output, the code generators produce the final source code 207 which includes a user interface. This patent application deals mainly with the Interaction Units (IU) of the meta-model that are used to define the User Interface Model which defines the desired User Interface. It has been found by the applicants that a high percent of user interfaces of prior art business applications can be built from a set of IU building blocks which are the patterns which a high percent of user interfaces user interfaces for business applications can be broken down into. These patterns or IU building blocks are part of the meta-model and are identified and described herein along with a graphical notation to use to express them, rules to validate them, and processes to generate code from the formal specification of the user interface including an inference process.

A detailed description is depicted in the following subsections:

A. The Pattern Language.
   B. ON-IU meta-model.
   C. XML DTD persistence model.
   D. Specification Editor.
   E. Graphical Notation.
   F. Validation Rules.
   G. Generation Process.
     G.1 Mappings
   H. Inference Process.

A. The Pattern Language.

The User Interface Model (FIG. 1. 109) is composed by a set of basic concepts and patterns. These patterns are used as building blocks by analysts to create the specification. A detailed description of the components in the Model will be presented next.

Figure 3:
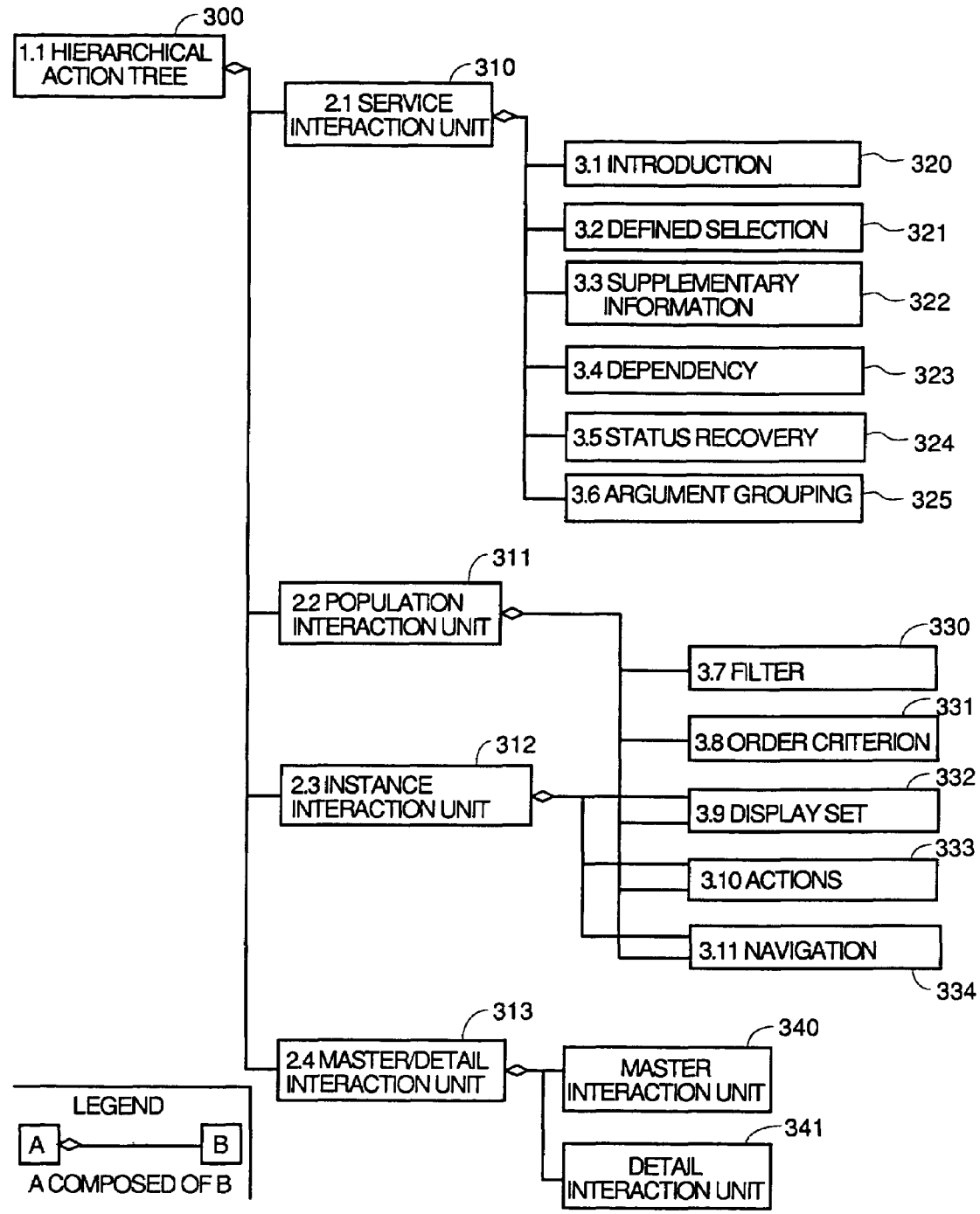
FIG. 3 is a block diagram showing the pattern language and the relationships between patterns.

FIG. 3 shows a block diagram showing the patterns used in the User Interface Model. The patterns are organized in three levels of a hierarchy. Level 1 comprises one pattern: the Hierarchical Action Tree Pattern 300. Level 2 is composed by Interaction Units patterns: Service IU 310, Population IU 311, Instance IU 312 and Master/Detail IU 313. Level 3 comprises auxiliary patterns: Introduction 320, Defined Selection 321, Supplementary Information 322, Dependency 323, Status Recovery 324, Argument Grouping 325, Filter 330, Order Criterion 331, Display Set 332, Actions 333 and Navigation 334. Master IU 340 and Detailed IU 341 are simpler Interaction Units used to compound a Master/Detail.

Each pattern will be described grouped by levels.

Level 1. Access.

1. Hierarchical Action Tree

A Hierarchical Action Tree (henceforward the acronym HAT will be used) is a tree structure to specify the user access to the exposed system functionality. A HAT contains labels as intermediates nodes in the tree and links to interaction units in the leaf nodes of the tree. This structure can be translated later to an application menu, popup menus, buttons, choice lists, links web pages or any other form of capable user interfaces mechanism to allow a user to select next action in an application.

Level 2. Interaction Units.

Interaction Units are based in Presentation Units defined by Vanderdonckt & Bodart (1993) as an abstraction of physical implementation of windows, web pages or user interface scenarios including any display on a computer screen or voice based interaction. The term "scenario" in this patent application means any displayed dialog box, voice based system, or other mechanism which provides information to the user and which may or may not be able to accept user input entered by any means such as voice, keyboard, pointing device of any type of such as mouse, touchpad, touchscreen, light pen, etc. However, Interaction Units have been improved with respect to Presentation Units containing a common abstract behavior independent from the device considered (Molina et al. 2002).

Interaction Units are abstractions used to describe and specify user interfaces in a platform independent way. This technology-neutral approach will allow code generation to several different platforms like Desktop UIs, Web UI, Mobile UI or Voice UI.

A set of four examples of Interaction Units are presented (Service, Instance, Population and Master/Detail interaction units). Each of them has a specific behavior depending on its type.

2.1 Service Interaction Unit

A Service Interaction Unit is used to describe the interaction of the user when launching a service in a system. Services (or methods in object-oriented jargon) are a mechanism of changing the state of the system. The state of the system is defined by the data in the data structures of its objects. Traditionally, services contain parameters that must be filled by the user (or the application using default values).

Figure 4:
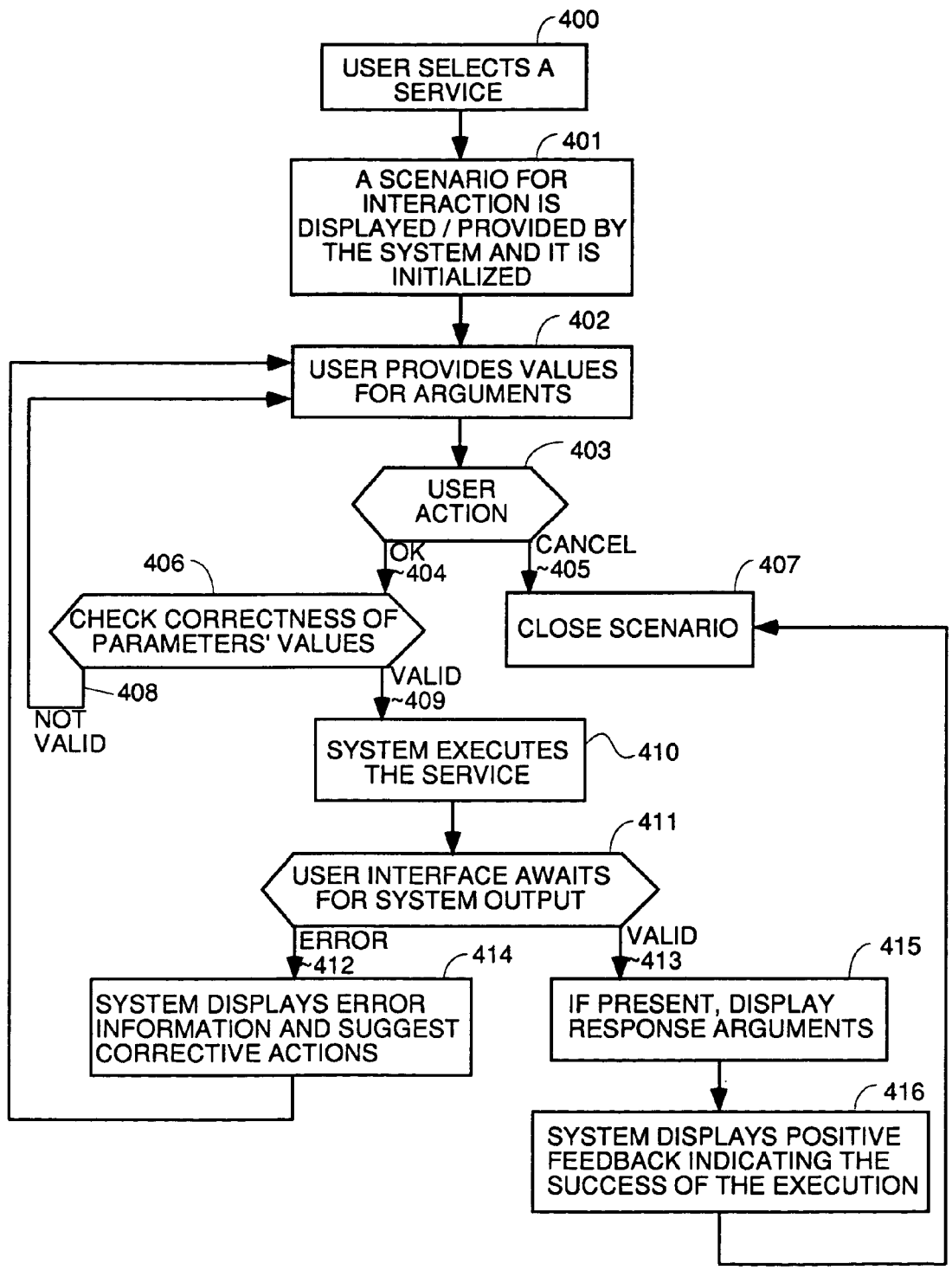
FIG. 4 is a flow chart of the tasks involved in the user interaction in Service Interaction Units in run-time.

The tasks involved in the execution (run time) of a Service Interaction Unit are shown in FIG. 4. The user selects (for example using a (1) HAT o an (3.10) Action item or any other selection mechanism) a service 400. As response, the system displays (or provides, in natural speech supported systems) a scenario implementing the Service IU 401 (typically a dialog box with fields that can be filled in by the analyst to supply arguments or parameters) and initializes parameters using system defaults, user preferences or context information. In such a scenario, the user can fill in fields of the dialog box (or use the voice to fill in the fields in a voice based system) to provide values for each parameter of the service 402. Once the user has finished introducing the data, he can launch the service 404 or cancel it 403. If canceled 405 the interaction scenario is closed. If the user select to launch the service (OK action) 404, the system checks the correctness of the values introduced by the user. The run-time check process 406 includes null checking, domain checking, value range checking, format and mask checking and object existence (for object references). As a result, if the values are not correct 408, an error message is output to the user and the user is encouraged to correct the error coming back to step 402. If the values are correct 409, the system launch the service in the system 410 and the UI awaits until completion providing feedback to the user. Once the service has been executed, if an error is produced 412, the system provides feedback explaining the error to the user and suggests possible actions to correct it 414 before returning to step 402. On the contrary, if the service is successfully executed 413, the system displays positive feedback indicating the successful execution 415. Finally, if the service contains output parameters (response parameters), they are shown to the user 416 before closing the scenario 407.

Service Interaction Units can have patterns applied to provide a more precise behavior. The patterns that can be applied are: Introduction 320, Defined Selection 321, Supplementary Information 322, Dependency 323, Status Recovery 324, and Argument Grouping 325. These others patterns will be described in the following sections.

Figure 5:
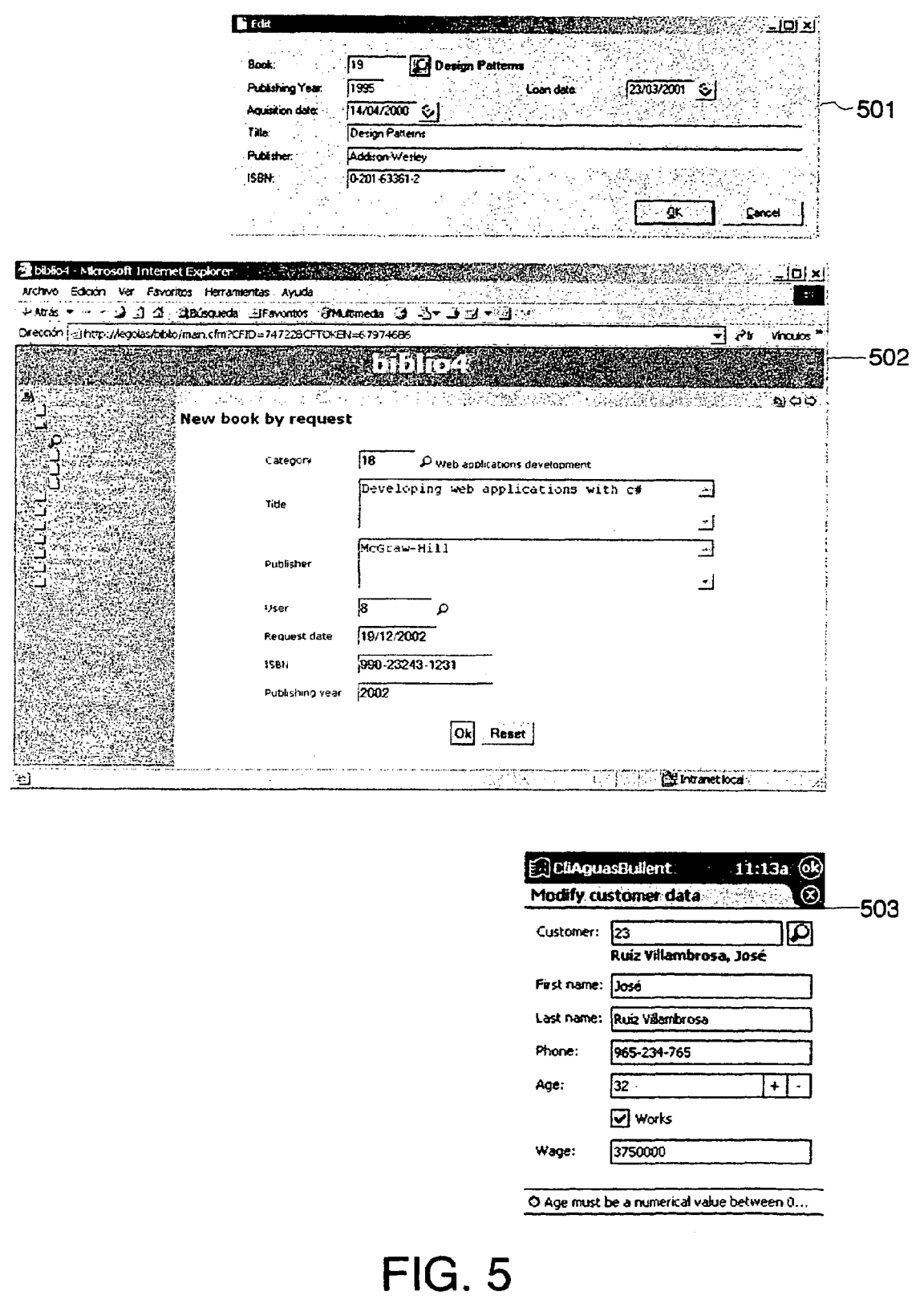

FIG. 5 shows examples of implementation of Service Interactions Units. Box 501 is an example for a user interface for a Desktop computer application program written in Visual Basic 6.0 high level programming language for the Windows operating system. Box 502 is an implementation example in the Cold Fusion MX high level programming language for a Web application. Similarly, box 503 is an implementation example of a dialog box for a mobile device, Pocket PC using the Windows CE operating system.

2.2 Instance Interaction Unit

Instance IUs are used for providing detailed information about one particular object. The goal is that the user can work with one object in order to view the state of the object (the values of the data in its data structure), alter its state (change the values in its data structure) or navigate to other related information.

Figure 6:
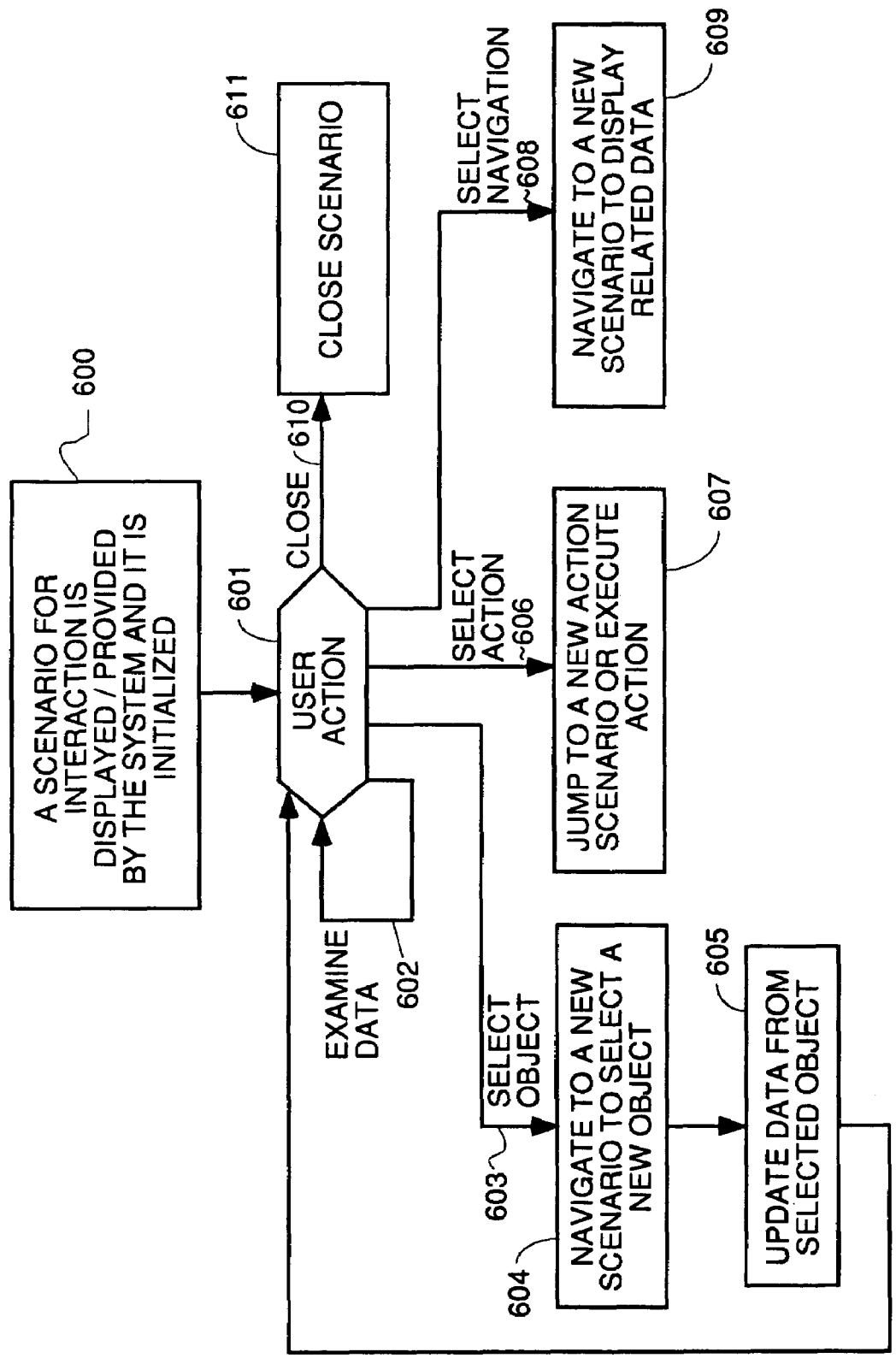
FIG. 6 is a flow chart of the tasks involved in the user interaction in Instance Interaction Units in run-time.

FIG. 6 is a flow-chart showing how the user interacts with the system in run-time during the interaction with an Instance Interaction Unit. First of all, the system provides a new scenario for interaction 600 and initializes it with default values in the various fields which represents the current state of the object or default values to save user time. The user can perform several actions 601: examine data 602, select a different object 603, select an action 606, select a navigation item or, close the scenario 610. The user can examine the data presented, as represented by path 602. If the user decides to change the object been reviewed 603, a new Population IU will be prompted to allow the user the selection of a new object 604, in which case, the computer will display a new scenario or dialog box which shows the current state of the newly selected object. In other words, when a new object has been selected, the data in the scenario is updated to reflect the state of the newly selected objects 605 and processing returns to step 601. If an action item has been selected 606, a new scenario can be provided to deal with the action if needed or the action can be executed immediately 607. If a navigation item has been selected 608 a new scenario is provided to show related information to the original object 609. Eventually, the scenario can be closed 611 whenever the user wants 610.

FIG. 7 shows examples of implementation of Instance Interactions Units. Box 701 is an example for Desktop UIs in Visual Basic 6.0/Windows. Box 702 is an implementation example in a mobile device, Pocket PC/Windows CE.

2.3 Population Interaction Unit

The Population IU is a pattern which is used in the User Interface Model to specify a user interface behavior that provides information of a set or population of objects related to a given class. Users can search for objects in the population satisfying a certain criteria using filters.

Figure 8:
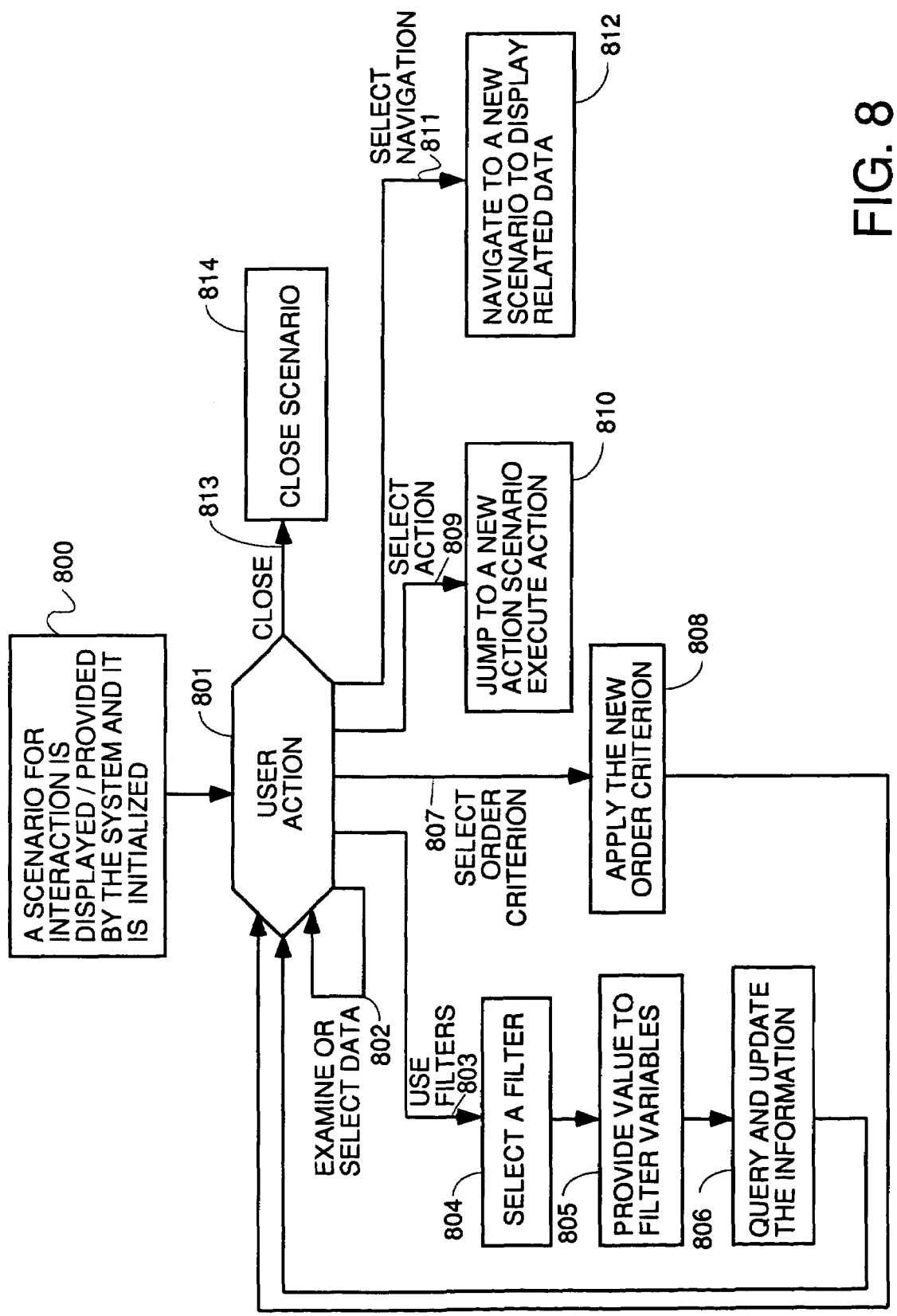
FIG. 8 is a flow chart of the tasks involved in the user interaction in Population Interaction Units in run-time.

The run-time tasks involved in the Population Interaction Unit are depicted in FIG. 8. First the scenario is provided 800, then, the user can choose from a set of tasks 801: examine or select data 802, use filters 803 to change the displayed population objects, select an order criterion 807 to change the order of the display of the displayed population of objects, select an action 809, select a navigation item 811 or, close the scenario 813. The user can examine the data (the objects shown) and optionally can select one or more objects 802. In the used decides to use a filter to constrain the population shown 803, first of all, he must select a filter 804, later the filter variables must be filled in 805 and, finally, the user launches the query 806. As a result, the system will execute the query and update the information accordingly. If a sort criterion is selected 807, the system applies such a sort criterion and updates the displayed information 808. If an action item has been selected 809, a new scenario can be provided to deal with the action if needed or the action can be executed immediately 810. If a navigation item has been selected 811 a new scenario is provided to show related information to the original object 812. Eventually, the scenario can be closed 814.

Figure 9:
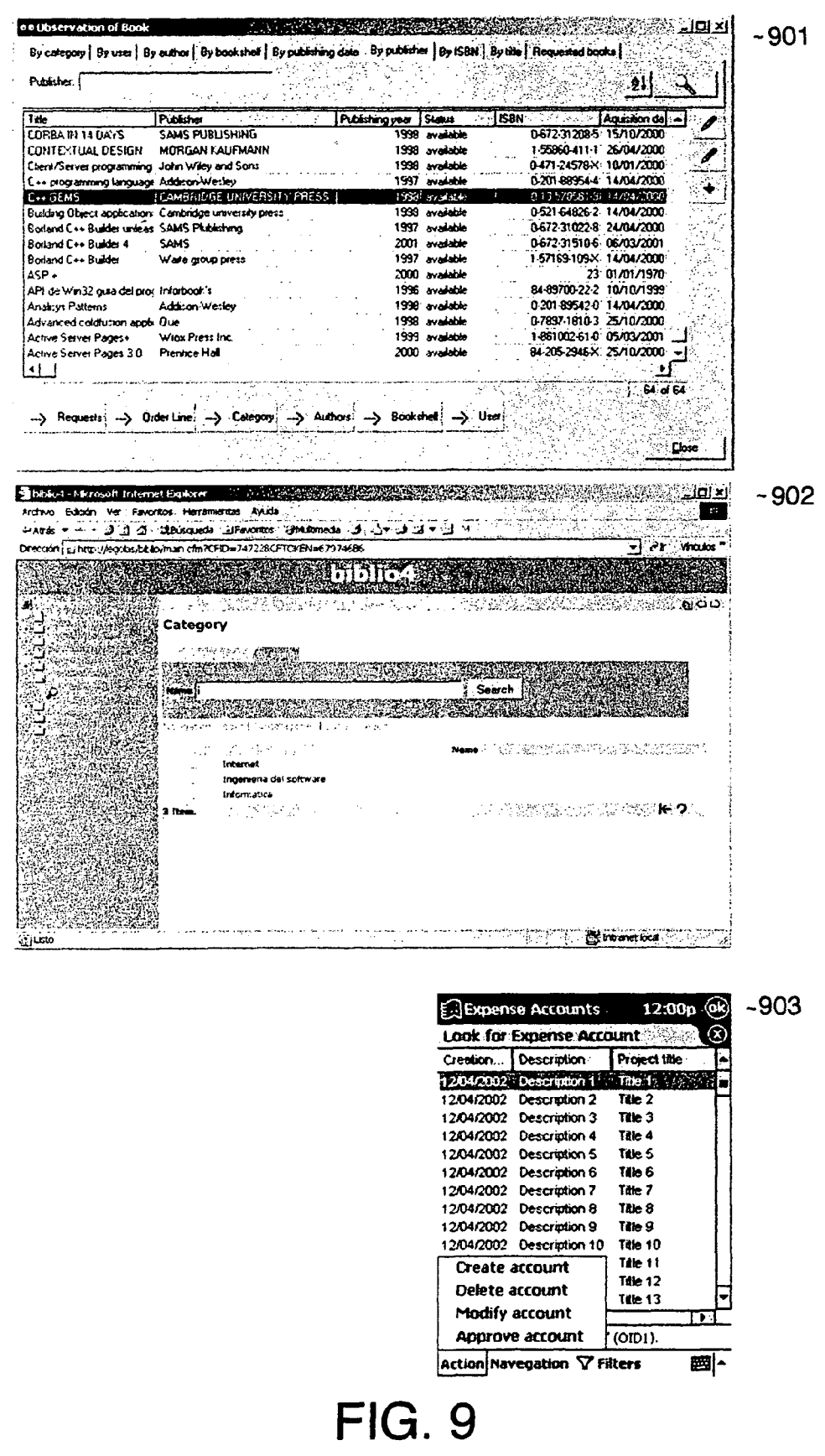

FIG. 9 shows running examples of implementation of Population Interactions Units. Box 901 is an example for Desktop UIs in Visual Basic 6.0/Windows. Box 902 is an implementation example in a Cold Fusion MX/Web application. Box 903 is an implementation example in a mobile device, Pocket PC/Windows CE.

2.4 Master/Detail Interaction Unit

A Master/Detail Interaction Unit captures how to present a certain object of a class including other related objects that may complete the full detail of the object. It is a composed IU. In Master/Detail IUs two or more simpler IUs are synchronized to provide information for related objects. There are two main components in the Master/Detail Interaction Unit: master IU and details IU.

The master IU is an IU capable of showing objects and fixing one of them. For example, one scenario involves an invoice header followed by a set of invoice lines related to the invoice. Possible master IUs are Instance and Population IUs.

A detail IU is an IU capable of showing related information with respect to a given master IU. Possible details IUs are Instance, Population and, recursively, Master/Detail IUs.

In a Master/Detail IU there is a validation rule that there can only be one master IU. Another validation rule is that there must be at least one detail IU. However, several details IUs can be used and linked to a single master IU. A detail component is specified indicating the following tuple: (Target IU, Alias, and Navigation Path). The navigation path is a well formed formula expressed in the OASIS language describing the link between the master class and the detail class. Usually, this kind of relationship is based on aggregation relationships and the Navigation path is specified indicating the roles crossed starting from the master class until reaching the target class. The meta-model allows class definitions and definition of relationships between classes. Relationship between classes can be of two types aggregation and inheritance.

Figure 10:
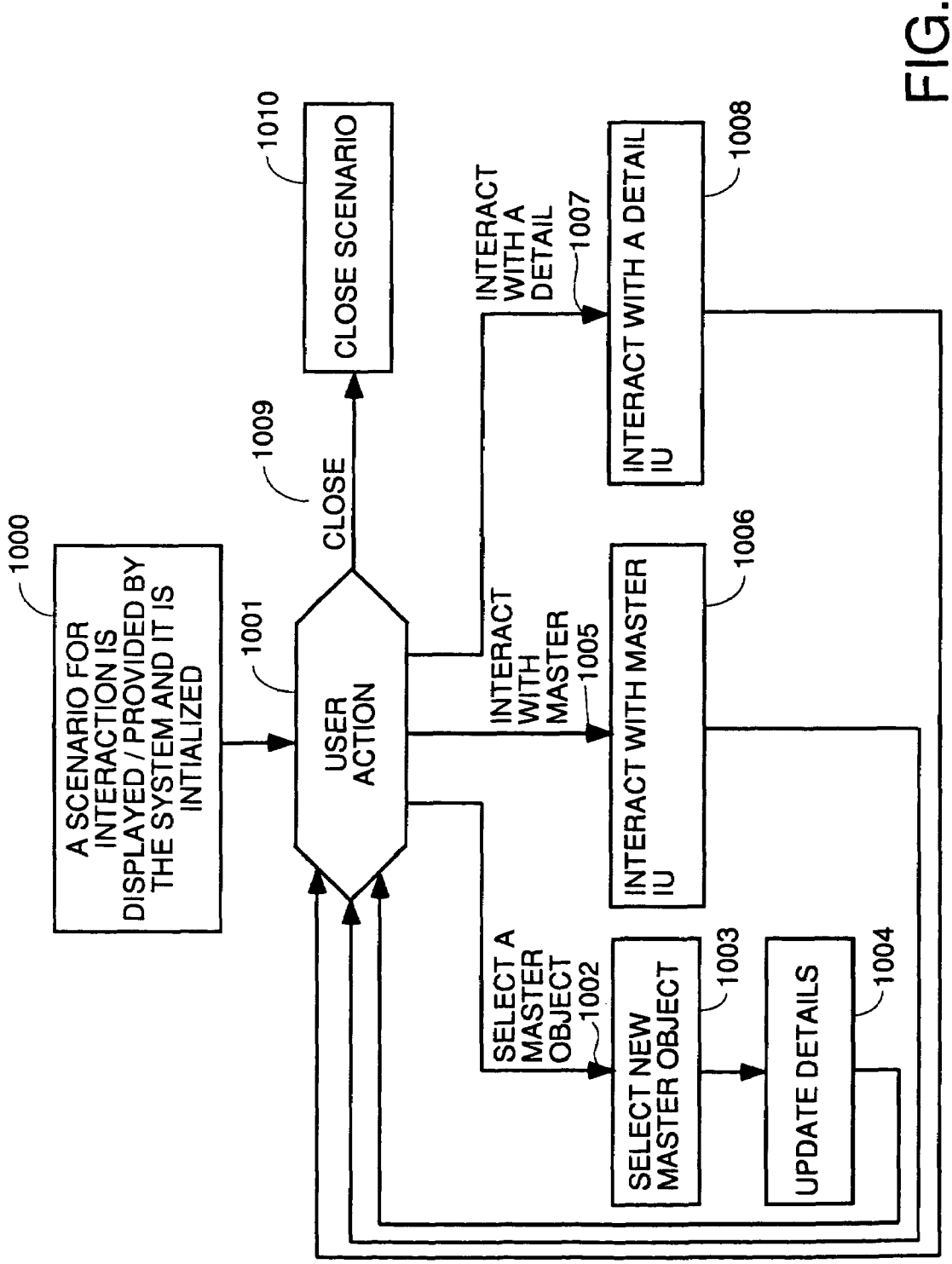
FIG. 10 is a flow chart of the tasks involved in the user interaction in Master/Details Interaction Units in run-time.

The user tasks involved in a Master/Detail IU are described in FIG. 10. On the user Master/Detail IU is displayed 1000, the user can take some actions as symbolized by step 1001. First the user selects a new master object 1002. Then, the selection is confirmed 1003 and all the details are updated accordingly 1004 depending on the Navigation Path expressed. If the user interacts with the master IU 1005, the behaviour is the defined behaviour or the IU considered (see Instance and Population IUs) 1006. If the user interacts with a detail IU 1007, the behaviour is the defined behaviour or the IU considered (see Instance, Population, and Master/Detail IUs) 1008. Finally, the user can close the scenario 1009 to conclude the interaction 1010.

Figure 11:
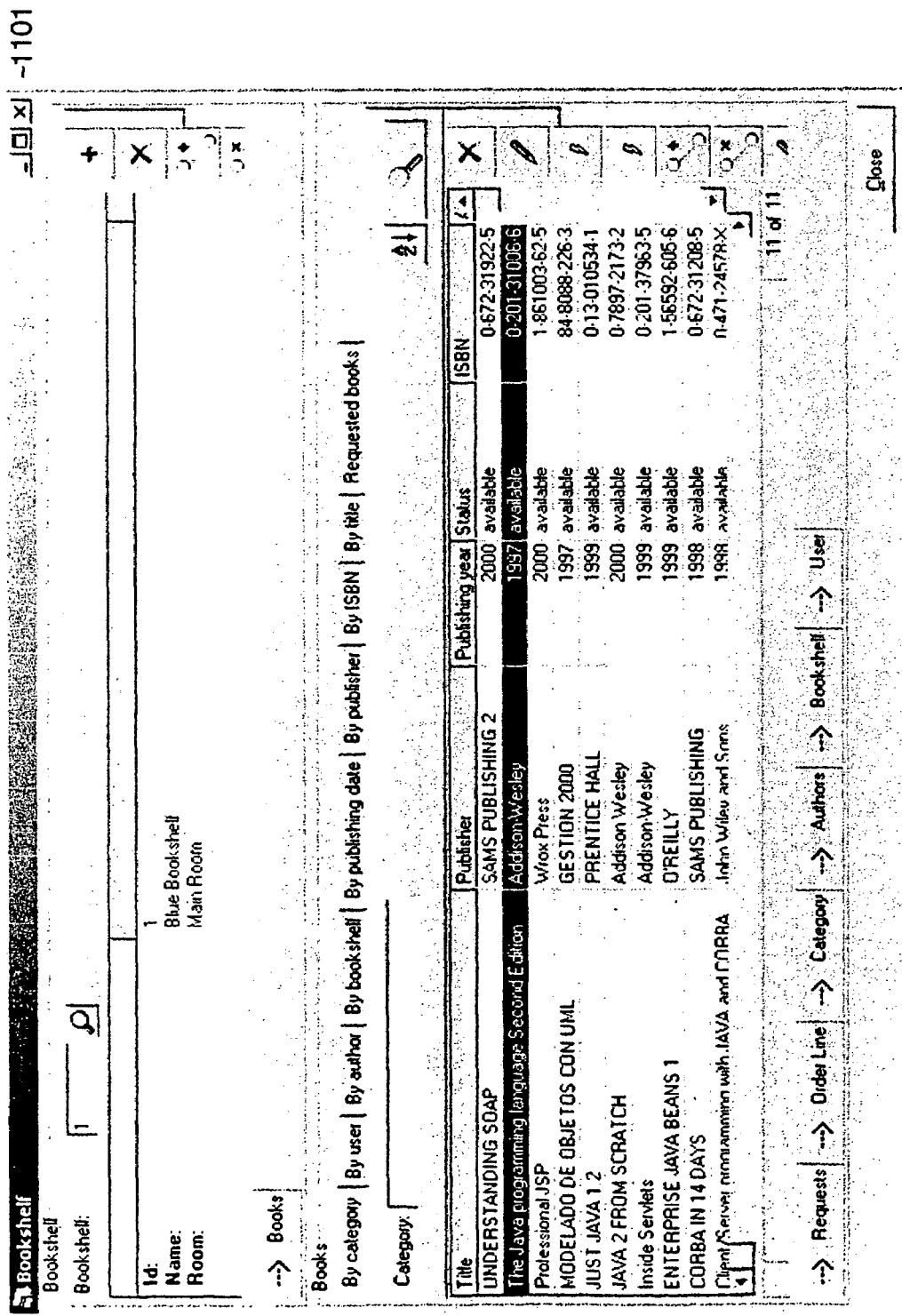
FIG. 11 contains an implementation example of running Master/Detail Interaction Unit.

FIG. 11 shows an example of implementation of Master/Detail Interactions Units. 1001 is an example for Desktop UIs in Visual Basic 6.0/Windows.

Level 3. Elemental Patterns.

3.1 Introduction

The Introduction Pattern is used to constrain the values that a user can provide for an argument. An Introduction pattern contains a name, an introduction mask, a range (lower and upper bound) and a help message.

3.2 Defined Selection

Defined Selection is used to declare a list of all possible values that can be taken by an argument. An enumeration list of pairs (code, label), a default value and a help message are the key properties for its definition.

3.3 Supplementary Information

This elemental pattern is used to provide feedback for OIDs (Object Identifiers). It is a reference to a Display Set. In other words, when an analyst types in an OID to make a selection in a dialog box, the supplementary information elemental pattern displays a nickname, the formal name or some more humanly recognizable information that tells the analyst what he just selected so he or she can verify that what was selected is what was intended to be selected.

3.4 Dependency

This elemental pattern is a list of ECA rules (Event-Condition-Action rules) to model the dynamic behaviour of the user interface in Service Interaction Units. Whenever a user changes a value in a field, the rules are checked. If the event matches with the event of some rule, the rule condition is checked and if fulfilled, the actions of the ECA rule are executed. Such actions can modify the state of others arguments in the Service IU.

3.5 Status Recovery

This elemental pattern is an implicit set of Dependency rules detected by the system for change services. Whenever Service has valuations (in the Functional Model) of the following form <attribute>=<parameter> for each parameter, generators can detect such a situation and produce default dependency rules to recover the current state of an object before modifying it. In other words, the existing state of an object is recovered and displayed when the service is invoked to give the end user a point of reference when invoking a service to change the state of an object.

For example: the class Customer contains the following attributes: name as string, address as string, phone as string and fax as string. A service is defined in the Customer class with the following name change_address. The arguments for the service are: p_cust as Customer, p_name as string, p_address as string, p_phone as string and p_fax as string.

In the Functional Model, the valuations (formulas that set values of attributes that change the state of an instance of the selected class to implement the service) for the class Customer and service change_address are:

$$name = p\_name \qquad (1)$$

$$address = p\_address \qquad (2)$$

$$phone = p\_phone \qquad (3)$$

$$fax = p\_fax \qquad (4)$$

The dependency rule automatically derived is:

[*]SetValue(p_Cust): true: p_name=SetValue (v.name);

p_address=SetValue(v.address);
p_phone=SetValue(v.phone);
p_fax=SetValue(v.fax)

In this context, when the user selects a customer and wants to change the data related to such a customer, he uses the service change_address. The service IU specification for the desired service in the user interface causes code to be generated which implements dependency rules that recover the data showing the state of the selected customer, i.e. once p_cust takes a value (a change event is produced), the dependency rules automatically derived cause the current values for name, address, phone and fax to be recovered and shown to the user as initial value of the arguments. The user can change some, none or all of these displayed argument values so as to change the state of the customer object and finally save the changes.

3.6 Argument Grouping

This elemental pattern can be invoked to put into the user interface model specification of a tree structure of arguments (especially where there are many arguments) to arrange the arguments in a logical and structured way. This will have implications in the layout of the code generated for arguments in the Service IU. It is useful when the number of arguments is high (more than 10).

3.7 Filter

A filter is an elemental pattern in Population IUs used for constraining object populations. Expressed as a well formed formula in the OASIS language, it can be evaluated to a boolean value for each object belonging to a given class in which the filter is defined. When the analyst invokes a population IU, a dialog box will be displayed by the editor which allows the analyst to specify a filter conditions such as for the class players, select only player objects which have attribute professional/amateur equal to professional. This filter pattern which cause a specification in the formal specification of the User Interface Model which causes the translator to generate code which examines all player instance objects in the class player and examines the professional/amateur attribute of each such instance and selects for display only those player objects having attribute professional/amateur equal to professional.

A filter can contain variables. Such variables are parameters that will be filled by the user in run time to define the filter conditions to make a precise query over the object population so as to select objects in accordance with the filter conditions for display a population IU.

Filter variables can have applied introduction, defined selection and supplementary information patterns.

3.8 Order Criterion

An order criterion is an elemental pattern in Population IUs which are ordered list of pairs (attribute, way). Where attribute is an attribute defined in the class or an expression visible from a given class and way indicates a sort mode: ascending way or descending way.

Its semantic is to apply a sort criterion based on the properties specified in the Order criterion.

3.9 Display Set

A Display Set is an elemental pattern in both Population IUs and Instance IUs which comprises an ordered list of expressions describing attributes or visible attributes from a given class. All classes have attributes. The display set defines some subset of those attributes or the entire set in some cases which will be displayed in the user interface for the selected instance specified by an Instance IU or the selected population specified by a Population IU.

The Display Set controls the information that will be visible by the user in the user interface of the final code generated from the User Interface Model specification.

3.10 Actions

This elemental pattern is a list of action items which can be defined in Population IUs and Instance IUs. Each action item contains an alias (a label for the user) and a target interaction unit. When the action elemental pattern is invoked in the editor to define some portion of a user interface in the User Interface Model of a program being modelled, there will result in the final code developed from the User Interface Model one or more action items.

Whenever the user selects an action item (for example, clicks on a button or press a link), he is redirected to the target interaction unit. In other words, a new interaction unit will appears in the user interfaces or replaces the previous one.

3.11 Navigation

This elemental pattern for interface definitions is a list of navigation items. Each navigation item contains an alias (a label for the user) and a target interaction unit and an expression in the OASIS language indicating the relationship crossed from the origin IU to the target IU. In this way, the information displayed in the target is related to the origin selected object.

For example: in an invoice population IU, the user selects one invoice and navigates to a lines population IU. As a result, only the lines belonging to such a selected invoice are presented.

B. ON-IU meta-model.

The ON-IU meta-model is a meta-model based in class diagrams to describe the structure and semantics of the pattern language presented for user interfaces. The meta-model and the pattern language including the IU patterns supply the building blocks the analyst uses when using the SOSY modeller program to build a User Interface Model that specifies the desired user interface in the finished program.

Figure 12:
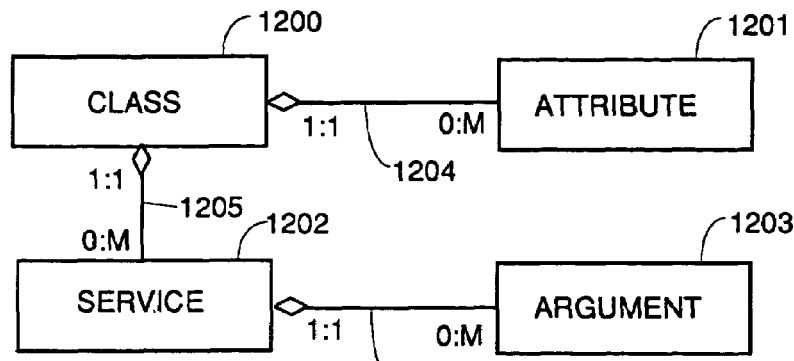
FIG. 12 is a class diagram describing the basic kernel meta-model for applying the ON-IU extension meta-model.

The ON-UI Meta-model extends a classical object-oriented meta-model as the OO-Method meta-model or the UML meta-model. As shown in FIG. 12, the only prerequisites needed for applying ON-UI are the concepts: Class 1200, Attribute 1201, Service (or method) 1202 and Argument 1203; and their usual relationships: class has attributes 1204, class has services 1205 and, service has arguments 1206.

As shown, the kernel of the meta-model is based on a minimal common object-oriented meta-model presents in almost all object-oriented methodologies. However, the surrounding classes constitute the added value for user interface specification. In this way, the user interface specification model is not limited to the presented object-oriented methodology OO-Method. On the contrary, it can be used to extend other object-oriented methods like UML, OMT or, OPEN.

Figure 13:
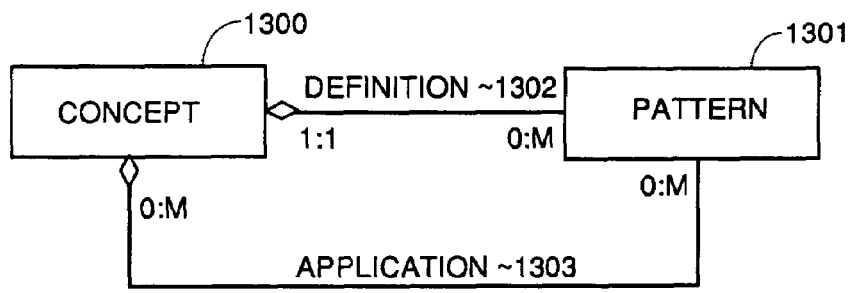
FIG. 13 is a class diagram showing the extension mechanism used in the meta-model for introducing the patterns extension.

The extension mechanism is based on introducing news elements: the patterns and each pattern's supporting classes and relationships. The link between patterns and traditional concepts is achieved using two kinds of relationships as shown in FIG. 13:

A.—Definition 1302. A pattern 1301 is always defined for a unique concept 1300. However, a concept can define different patterns at the same time which is why the line between the concept and pattern blocks has the notation 0:M meaning the concept can have from 0 to M patterns that implement it. The kind of relationship is established at pattern creation time. For example, Filters, Display Sets, and Navigation elemental patterns are defined for a Class. Service Interaction Unit is an IU pattern defined for a Service.

B.—Application 1303. A pattern 1301 can be applied to concepts 1300. In this sense, patterns can be reused in the model (applied in different scenarios). For example, Population IU patterns can be used to display a list of all golfers that have entered a tournament or a list of all lines of a selected invoice. Application relationships are established by the analyst when building the model by filling in or selecting data from list in dialog boxes which appear when icon for a particular IU is selected for inclusion in a User Interface Model. For example: an analyst fills in data in dialog boxes to define Filter, Display Set, and Navigation are applied (or used) when defining a Population Interaction Unit during building of a user interface model specification.

Using the relationships just described, the meta-model for interaction units will be described:

B.1 Meta-Model for Service Interaction Unit

Figure 14:
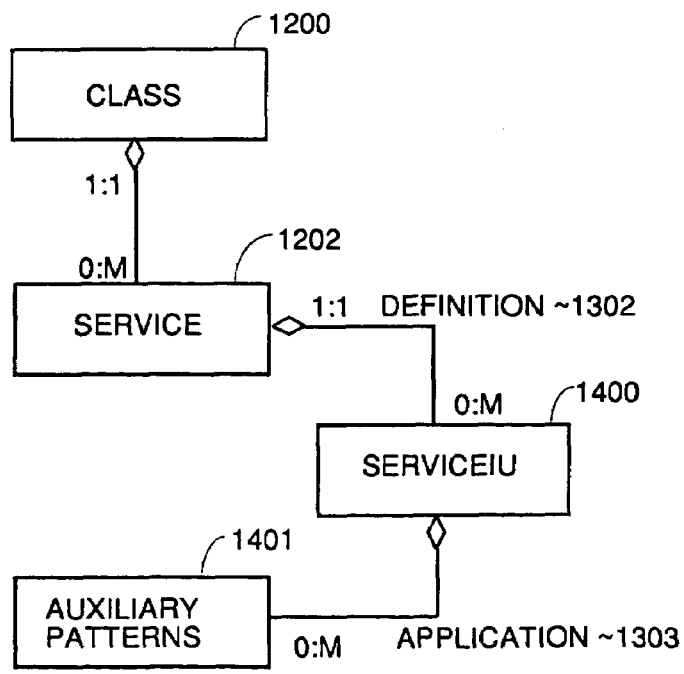
FIG. 14 is a class diagram describing the meta-model for Service Interaction Unit.

FIG. 14 shows the meta-model for Service IU. A class represents the Service IU 1400 and its relationships with the rest of the model. Service IU 1400 are defined 1302 over Services 1202. Other auxiliary patterns 1401 can be applied 1303 to a Service IU 1400. Specifically, the auxiliary patterns 1401 that can be applied to a Service IU are: Introduction, Defined Selection, Dependency, Status Recovery and Argument Grouping.

B.2 Meta-Model for Instance Interaction Unit

Figure 15:
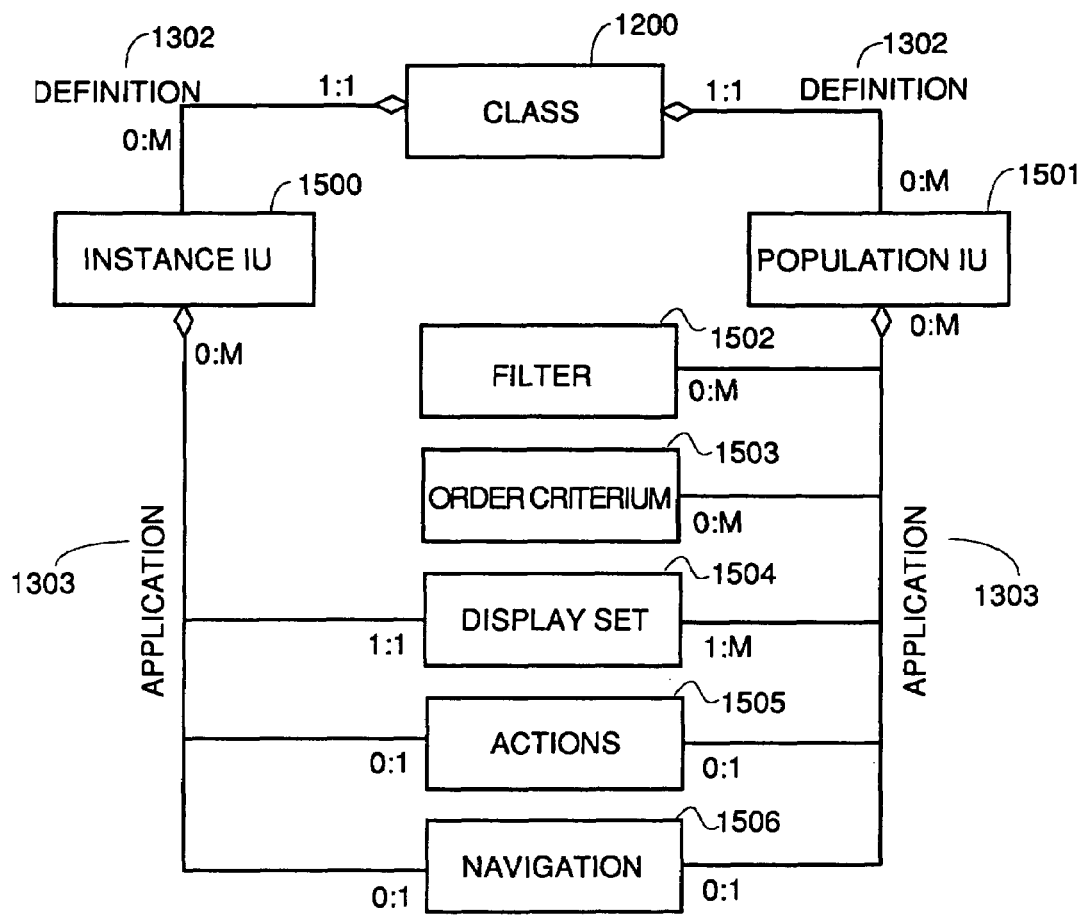
FIG. 15 is a class diagram describing the meta-model for Instance and Population Interaction Unit.

FIG. 15 describes the meta-model of Instance IU 1500. An Instance IU 1500 is defined 1302 over a Class 1200. The more elementary patterns that can be applied 1301 or defined for an Instance IU are Display Set 1504 (only one), Actions 1505 (optional) and Navigation 1506 (optional).

B.3 Meta-Model for Population Interaction Unit

The meta-model of Population IU 1501 is also described in FIG. 15. A Population IU is defined 1302 over a Class 1200. The patterns that can be applied 1301 to a Population IU 1501 are Filters 1502 (zero or more), Order Criteria (zero or more) 1503, Display Set 1504 (one or more), Actions 1505 (optional) and Navigation 1506 (optional).

B.4 Meta-model for Master/Detail Interaction Unit

Figure 16:
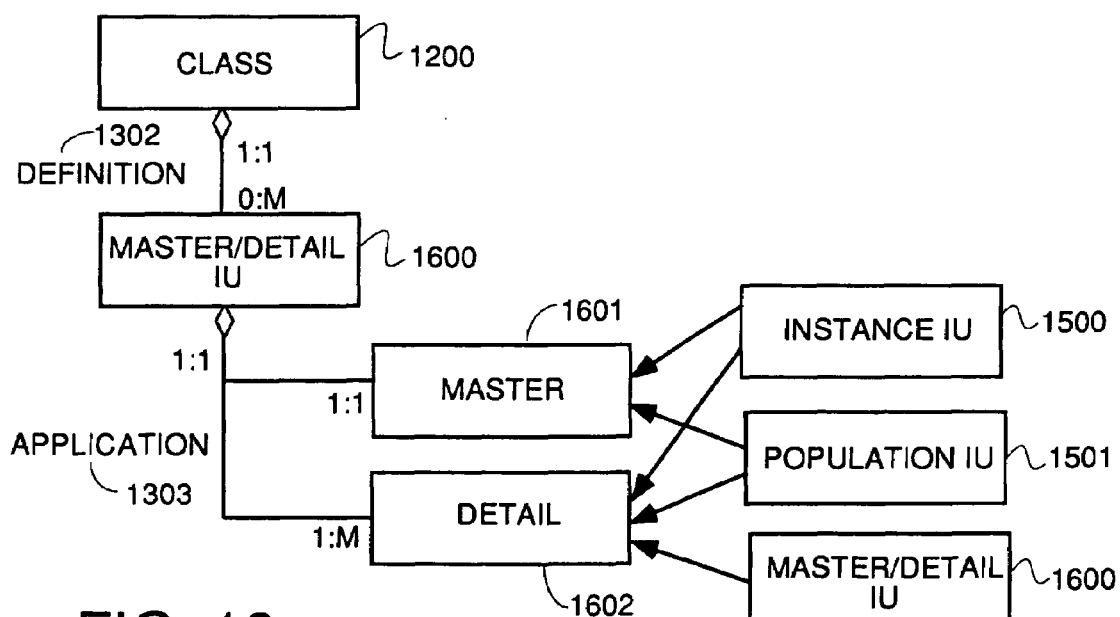
FIG. 16 is a class diagram describing the meta-model for Master/Detail Interaction Unit.

FIG. 16 describes the meta-model of Master/Detail IU 1600. A Master/Detail IU 1600 is defined 1302 over a Class 1200. A Master/Detail IU contains two components: a master and one or more detail. The patterns that can be applied 1301 to a Master/Detail IU can play two different roles Master 1601 or Detail 1602. In the Master component 1601, only Instance 1500 and Population 1501 IUs can be used. However, a detail can contain pointers to an Instance IU 1500, a Population 1501 IUs as well as another Master/Detail IU 1600 (recursively). From the picture, the cardinalities (the lines between the box 1600 and the boxes 1601 and 1602) show that a Master/Detail IU 1600 has only one Master 1601 and one or more Details 1602.

C. XML DTD Persistenc e Model.

As a complement of the meta-model introduced, the XML persistence format is used in the preferred embodiment as a serializer/deserializer tool that allows to store the formal specification of the User Interface Model (and all the others models in the Conceptual Model of the application program that the analyst built using the SOSY modeler) in an XML file or to transmit it as plain text.

The corresponding DTD (document type definition) for XML is provided, but in alternative embodiments, any data structure, file structure, database, etc. that contains the necessary information can be used to record the formal language specification of the User Interface Model as well as the other models in the Conceptual Model of the program to be automatically coded.

A DTD is a data structure composed of elements and attributes. Elements can contains other elements and attributes. For example:

```
<!ELEMENT Class (Attribute*, Service*, Class.DefinedPatterns?,
    Class.AppliedPatterns?)>
<!ATTLIST Class
    Name CDATA #REQUIRED
    Alias CDATA #IMPLIED
>
```

In a DTD this means: The element Class is composed of a sequence (a comma list means sequence): One or more Attributes (* means one or more), One or more Services, Zero or one Class.DefinedPatterns (? Means zero or one), Zero or one Class.AppliedPatterns? (? Means zero or one).

DTD Operators are: (*) zero or more, (+) one or more, (?) zero or one, (nothing) exactly one, (A1, A2) sequence, (A1|A2) choice, and ( ( ) ) parenthesis for grouping. Attributes can be #Required (mandatory) or #Implicit (optional).

For a detailed description of XML and DTDs please refer to the reference "Extensible Markup Language (XML) 1.0 (Second Edition)" Word Wide Web Consortium.

```
<?xml version="1.0" encoding="UTF-8"?>
<!-- Just-UI DTD Meta-model v. 1.0 05.12.2002 ================= -->
<!-- (c) Pedro J. Molina Moreno, 2002. ========================= -->
<!-- ======================================================== -->
<!-- Minimal OO Core-Kernel: Class, Attribute, Service (Method), Argument -->
<!-- ======================================================== -->
<!ELEMENT JustUISpec (Class*, Introduction*, DefinedSelection*, View*)>
<!ATTLIST JustUISpec
    Name CDATA #REQUIRED
    Version CDATA #REQUIRED
>
```

The formal specification of the Conceptual Model in a formal language as defined herein (hereafter just called the specification) starts with the root element JustUISpec containing all the specification. A specification contains list of classes, Introduction and Defined Selection Patterns (both defined at the Specification level to make easier their later reuse) and Views. The attributes name and version of the JustUISpec element refers to the name and version of the specification.

```
<!ELEMENT Class (Attribute*, Service*, Class.DefinedPatterns?,
Class.AppliedPatterns?)>
<!ATTLIST Class
    Name CDATA #REQUIRED
    Alias CDATA #IMPLIED
>
```

These fields define a class. There will be a set of these fields for every class defined in the Conceptual Model. A class contains a list of attributes, services, and optionally defined patterns and class applied patterns. Classes have two relevant properties: name and alias. Class names must be unique in the specification. However, aliases are visual labels or shortened nicknames (hereafter referred to as visual labels) used to represent the class in the visual displays of the user interface to the users. Aliases can be localized depending on the language of the final user of the application.

```
<!ELEMENT Attribute (Attribute.AppliedPatterns?)>
<!ATTLIST Attribute
    Name CDATA #REQUIRED
    Domain CDATA #REQUIRED
    Alias CDATA #IMPLIED
>
```

These fields define one attribute. There will be a set of these fields for every attribute of every class. Each attribute contains (optionally) applied patterns. Relevant properties are the name of the attribute (must be unique within the class scope), domain (data type) and alias (visual label for users).

```
<!ELEMENT Service (Argument*, Service.DefinedPatterns?)>
<!ATTLIST Service
    Name CDATA #REQUIRED
    Alias CDATA #IMPLIED
>
```

These fields define a service of a class. There will be a set of these fields which define every service of every class. A service contains a list of arguments, and optionally a Service defined patterns. Relevant properties are name of the service (must be unique in class scope) and alias (visual label for users).

```
<!ELEMENT Argument (Argument.AppliedPatterns?)>
<!ATTLIST Argument
    Name CDATA #REQUIRED
    Domain CDATA #REQUIRED
    Alias CDATA #IMPLIED
>
```

These fields define an argument of a service. There will be a set of these fields for every argument of every service of every class. An argument contains (optionally) applied patterns(patterns that constrains the behaviour of an argument). Relevant properties are name of the argument (must be unique in service scope), domain (data type), and alias (visual label for users).

```
<!-- Auxiliary Formula Element ============== -->
<!ELEMENT Formula (#PCDATA)>
```

Element Formula it is used to store the well-formed formulas in the specification. Well-formed formulas are formulas for mathematical or logical manipulation of data written correctly according to the syntax of the formal language in which said specification is being written.

```
<!-- ==================================================== -->
<!-- L3.1 Introduction Pattern =========================== -->
<!ELEMENT Introduction EMPTY>
<!ATTLIST Introduction
    Name CDATA #REQUIRED
    EditMask CDATA #IMPLIED
    DefaultValue CDATA #IMPLIED
    LowerBound CDATA #IMPLIED
    UpperBound CDATA #IMPLIED
    MaxChars CDATA #IMPLIED
    AllowsNulls CDATA #IMPLIED
    ErrorMsg CDATA #IMPLIED
    HelpMsg CDATA #IMPLIED
>
```

Patterns are the templates or building blocks from the meta-model that are used to define a user interface in a shorthand sort of way. Patterns are used in two phases: first a pattern is created, later a pattern is applied so solve an specific problem.

When created, a pattern is defined in somewhere of the specification. For example: a filter is created for a given class. In this case, a filter is created and a relationship with its defining class is established.

The second phase "application" occurs when the analysts reuses the patterns in the specification to solve similar problems in several parts of the specification. Different "applications" of the same pattern provides reuse of patterns and provides homogeneity. To create a pattern means to fill in required data to define its behavior or the content of what will be displayed in the user interface that results. Interaction Units like Population IU are patterns, but they to have other mandatory or optional elemental patterns applied to them like filter conditions and the other patterns in FIG. 3 at the most detailed level of the HAT tree. An Introduction Pattern serves the "constraint on argument" function for Service Ius and is described elsewhere herein. The above set of fields represent application of the constraints of an elemental Introduction Pattern, and there will be a set of such fields for every Service IU which is constrained by an Introduction Pattern.

An Introduction Pattern is specified providing the following properties: name, edit mask (a mask used to constrain editing), a default value, a range of variation (lower bound & upper bound), the number of maximum characters allowed (maxchars), if the argument allows null or not, an error message and a help message.

```
<!-- L3.2 Defined Selection Pattern =================== -->
<!ELEMENT DefinedSelection (DefSelItem*)>
<!ATTLIST DefinedSelection
    Name CDATA #REQUIRED
    DefaultValue CDATA #IMPLIED
```

```
    MinSelectable CDATA #IMPLIED
    MaxSelectable CDATA #IMPLIED
    AllowsNulls CDATA #IMPLIED
    ErrorMsg CDATA #IMPLIED
    HelpMsg CDATA #IMPLIED
>
<!ELEMENT DefSelItem EMPTY>
<!ATTLIST DefSelItem
    Code CDATA #REQUIRED
    Alias CDATA #IMPLIED
>
```

The above set of fields represent the definition of a Defined Selection pattern to a Service IU. The function of a Defined Selection pattern is to provide a list of available selections for an argument from which a user can choose to prevent errors in entering arguments for a service. There will be a set of these fields for every Defined Selection pattern in the model. A Defined Selection pattern is specified providing a list of Defined Selection Items and the following properties: name, a default value, a range of variation of selectable items (minSelectable & maxSelectable), if the argument allows null or not, an error message and a help message.

A Defined Selection Item contains a unique code (for the machine) and an alias (visual label for the user).

```
<!-- L3.3 OID Feedback =========================== -->
<!ELEMENT OIDFeedback EMPTY>
<!ATTLIST OIDFeedback
    Class CDATA #REQUIRED
    DisplaySet CDATA #REQUIRED
>
```

These fields represent application of any OIDFeedback elements in the specification. The OIDFeedback element contains the information for the Supplementary Information Pattern. It is specified providing the name of a class and a Display Set defined in such class. This Display Set will be used be show to the user as feedback the values of the fields listed in the display set.

```
<!-- L3.4 Dependency Pattern =========================== -->
<!ELEMENT Dependency (ECARule+)>
<!ELEMENT ECARule (Formula)>
```

These fields represent the definition & application of any Dependency Patterns in the specification. A Dependency pattern consists on a list of one or more ECA rules. Each ECA (event-Condition-Action) rule is expressed as a formula.

```
<!-- L3.5 Status Recovery =========================== -->
<!-- Implicit behauvour. Not specified. -->
```

This comment refers to the implicit Status Recovery Pattern that do not need any specification.

```
<!-- L3.6 Argument Grouping =========================== -->
<!ELEMENT ArgumentGrouping (ArgGroup.Node*)>
<!ELEMENT ArgGroup.Node (ArgGroup.Node*)>
```

```
<!ATTLIST ArgGroup.Node
    Alias CDATA #IMPLIED
    Argument.Name CDATA #IMPLIED
>
```

These fields represent the definition & application of any argument grouping elemental pattern used in the specification of a service IU. A set of these fields will be present for each argument grouping pattern used. ArgumentGrouping element refers to the Argument Grouping Pattern. It contains a list of child sub-groupings. Each sub-grouping can contain another list of sub-grouping or an alias and a pointer to an argument being grouped (Argument.Name).

```
<!-- L3.7 Filter =========================== -->
<!ELEMENT Filter (Formula, FilterVariable*)>
<!ATTLIST Filter
    Name CDATA #REQUIRED
    Alias CDATA #IMPLIED
    HelpMsg CDATA #IMPLIED
>
```

These fields represent the application of a filter pattern with the filter condition set by data expressing a formula and a list of filter variables. There will be a set of these fields for every filter defined. A Filter contains a Formula and a list of filter variables. The properties for a filter are: the name of the filter, the alias (visual label) and a help message for the final user to be shown in run time.

```
<!ELEMENT FilterVariable (FilterVar.AppliedPatterns?)>
<!ATTLIST FilterVariable
    Name CDATA #REQUIRED
    Domain CDATA #REQUIRED
    Alias CDATA #IMPLIED
    HelpMsg CDATA #IMPLIED
>
```

These fields represent the definition of a filter variable elemental pattern for a filter pattern, and there will be a set of these fields for every filter variable used. Each filter variable contains (optionally) patterns applied. As properties, a filter variable has a name, a domain (data type) an alias (visual label) and a help message to be shown in the generated application.

```
<!-- 3.8 Order Criterium =========================== -->
<!ELEMENT OrderCriterium (OrderCriteriumItem+)>
<!ATTLIST OrderCriterium
    Name CDATA #REQUIRED
    Alias CDATA #IMPLIED
    HelpMsg CDATA #IMPLIED
>
<!ELEMENT OrderCriteriumItem (Formula)>
<!ATTLIST OrderCriteriumItem
    Direction (ASC | DES) #REQUIRED
>
```

These fields represent the definition of an Order Criterion pattern. A set of these fields will exist for every Order Criterion in the formal specification of the user interface. An Order Criterion contains an ordered list of one or more Order Criterion Items. Each Order Criterion has a name, an alias (visual label) and a help message. Order Criterion Items contains a formula (pointing to an existing attribute) and a sort order (ascending or descending).

```
<!-- L3.9 Display Set =========================== -->
<!ELEMENT DisplaySet (DisplaySetItem+)>
<!ATTLIST DisplaySet
    Name CDATA #REQUIRED
    Alias CDATA #IMPLIED
>
<!ELEMENT DisplaySetItem (Formula)>
<!ATTLIST DisplaySetItem
    Alias CDATA #IMPLIED
>
```

These fields represent the definition of a Display Set elemental pattern. There will be a set of these fields for every Display Set defined in the formal specification of the User Interface Model. A Display set contains an ordered list of Display Set Items. As properties it has a name (unique in the class scope) and an alias (visual label). Each Display Set Item has a formula (pointing to an existing attribute) and an alias (visual label).

```
<!-- L3.10 Actions =========================== -->
<!ELEMENT Actions (ActionItem+)>
<!ATTLIST Actions
    Name CDATA #REQUIRED
    Alias CDATA #IMPLIED
>
<!ELEMENT ActionItem EMPTY>
<!ATTLIST ActionItem
    TargetIU CDATA #REQUIRED
    Alias CDATA #IMPLIED
>
```

These fields represent the definition of an Action Pattern. There will be a set of these fields for every applied Action Pattern. Actions Pattern contains an ordered list of Action Items. As properties it has a name (unique in the class scope) and an alias (visual label). Each Action Item has a target interaction unit and an alias (visual label).

```
<!-- L3.11 Navigation =========================== -->
<!ELEMENT Navigation (NavigationItem+)>
<!ATTLIST Navigation
    Name CDATA #REQUIRED
    Alias CDATA #IMPLIED
>
<!ELEMENT NavigationItem (Formula)>
<!ATTLIST NavigationItem
    TargetIU CDATA #REQUIRED
    Alias CDATA #IMPLIED
>
```

These fields represent the definition of an elemental Navigation Pattern. Navigation Pattern contains an ordered list of Navigation Items. As properties it has a name (unique in the class scope) and an alias (visual label). Each Navigation Item has a target interaction unit and an alias (visual label) and a formula specifying the aggregation relationships crossed to reach the target interaction unit.

```
<!-- L2.1 IU Service =========================== -->
<!ELEMENT IU.Service (ArgumentGrouping?)>
```

-continued
```
<!ATTLIST IU.Service
    Name CDATA #REQUIRED
    Alias CDATA #IMPLIED
    HelpMsg CDATA #IMPLIED
>
```

These fields represent the definition of an instance of a Service IU. There will be a set of these fields for every Service IU defined in the User Interface Model formal specification. An implicit pointer to the service associated with the Service IU exists when these fields are within the data structure of a service. An explicit pointer field could also be used. A Service Interaction Unit may have an Argument grouping (optional). As relevant properties it has a name, and alias (visual alias) and a help message.

```
<!-- L2.2 IU Instance =========================== -->
<!ELEMENT IU.Instance (Ref.DisplaySet, Ref.Actions?,
Ref.Navigation?)>
<!ATTLIST IU.Instance
    Name CDATA #REQUIRED
    Alias CDATA #IMPLIED
    HelpMsg CDATA #IMPLIED
>
```

These fields represent the definition of an instance of an Instance IU to define part of a user interface. There will be a set of these fields for each Instance IU defined in the model. An Instance Interaction Unit has a Display Set (compulsory), Actions (optional) and Navigation (optional). As relevant properties it has a name, and alias (visual alias) and a help message.

```
<!-- L2.3 IU Population =========================== -->
<!ELEMENT IU.Population (Ref.Filter*, Ref.OrderCriterium*,
Ref.DisplaySet+, Ref.Actions?,
Ref.Navigation?)>
<!ATTLIST IU.Population
    Name CDATA #REQUIRED
    Alias CDATA #IMPLIED
    HelpMsg CDATA #IMPLIED
>
```

These fields represent the definition of an instance of a Population IU. There will be a set of these fields for every Population IU defined in the specification. A Population Interaction Unit has a list of Filters (optional), Order Criteria (optional), one or more Display Sets, Actions (optional) and Navigation (optional). As relevant properties it has a name, and alias (visual alias) and a help message.

```
<!-- L2.4 IU Master/Detail =========================== -->
<!ELEMENT IU.MasterDetail (DetailIU*)>
<!ATTLIST IU.MasterDetail
    Name CDATA #REQUIRED
    Alias CDATA #IMPLIED
    HelpMsg CDATA #IMPLIED
    MasterIU CDATA #REQUIRED
>
<!ELEMENT DetailIU (Formula)>
<!ATTLIST IU.MasterDetail
    Alias CDATA #IMPLIED
    DetailTargetIU CDATA #REQUIRED
>
```

These fields represent the definition of an instance of a Master/Detail IU including a pointers to Detail IUs expressed as a formula. These fields control what code for the user interface will be automatically generated from this specification and therefore control what will be displayed in the display of the user interface caused by this Master/Detail IU, and the same statement applies to every field in the data structure of the formal specification of the user interface. A Master/Detail Interaction Unit has a list of one or more Details (compulsory). As relevant properties it has a name, and alias (visual alias), a help message, and the name of an Interaction Unit acting as the Master. Each detail contains a formula expressing the aggregation path crossed to reach the detail from the master, an alias (visual label) and a target Interaction Unit playing the role of detail.

```
<!-- Auxiliar components -->
<!ELEMENT Ref.Introduction (#PCDATA)>
<!ELEMENT Ref.DefinedSelection (#PCDATA)>
<!ELEMENT Ref.Filter (#PCDATA)>
<!ELEMENT Ref.OrderCriterium (#PCDATA)>
<!ELEMENT Ref.DisplaySet (#PCDATA)>
<!ELEMENT Ref.Actions (#PCDATA)>
<!ELEMENT Ref.Navigation (#PCDATA)>
```

Ref.* elements refers to pointers to existing Introduction, Defined Selection, Filter, Order Criterion, Display Set, Actions, an Navigation patterns, respectively, specified in other fields of the data structure. This pointers indicates the application of the pattern in other contexts. Whenever a pattern is reused in some where else location of the specification a pointer of this type will be used to refer to the pattern.

```
<!-- L1. Hierarchical Action Tree ============= -->
<!ELEMENT HAT (HAT.Node)>
<!ATTLIST HAT
    Name CDATA #REQUIRED
    Alias CDATA #IMPLIED
>
<!ELEMENT HAT.Node (HAT.Node*)>
<!ATTLIST HAT.Node
    Alias CDATA #IMPLIED
    TargetIU CDATA #IMPLIED
>
```

These fields define the HAT element. A view can have applied a HAT. The HAT element is used to specify the Hierarchical Action Tree Pattern. Each HAT contains a list of child nodes and a name and alias. Each node contains, recursively, child nodes or an alias and a target interaction unit.

```
<!-- Defined patterns for Classes ============= -->
<!ELEMENT Class.DefinedPatterns (IU.Instance*, IU.Population*,
IU.MasterDetail*, Filter*,
OrderCriterium*, DisplaySet*, Actions*, Navigation*)>
```

These fields define the allowable patterns that can be defined in a class. The Class.DefinedPattern fields describe the patterns that can be defined in a Class. A class contains a list of Service IUs, Instance IUs, Population IUs, Master/Detail IUs, Filters, Order Criteria, Display Sets, Actions, and Navigation.

```
<!-- Applied patterns for Classes ============= -->
<!ELEMENT Class.AppliedPatterns (OIDFeedback?,
Default.IU.Instance?, Default.IU.Population?)>
<!ELEMENT Default.IU.Instance (#PCDATA)>
<!ELEMENT Default.IU.Population (#PCDATA)>
```

These fields define the Applied Patterns data for a class. The Class.Applied Patterns fields describe the patterns that can be applied for a Class. It contains an optional Supplementary Information pattern (OIDFeedback element), a default Instance and Population IUs (these are the default scenarios used when there is a need to search for objects or show data for objects in the given class).

```
<!-- Applied patterns for Attributes ============= -->
<!ELEMENT Attribute.AppliedPatterns (Ref.Introduction? |
Ref.DefinedSelection?)>
```

These fields are references to Introduction and Defined-Selection elemental patterns that have been applied to constrain the end user of the interface. The Attribute.Applied Patterns describes the elemental patterns that can be applied to constrain end user entry of data for an attribute. It contains an optional Introduction or Defined Selection Pattern which are two types of pattern constraints on entry of data to define an attribute.

```
<!-- Defined patterns for Services ============= -->
<!ELEMENT Service.DefinedPatterns (IU.Service*)>
```

This is an auxiliary element to show that Service IUs can be defined in the scope of a Service. The Service.Defined Patterns describes the patterns that can be defined in a Service. Service IUs can be defined here.

```
<!-- Applied patterns for Arguments ============= -->
<!ELEMENT Argument.AppliedPatterns (((Ref.Introduction? |
Ref.DefinedSelection?) | (OIDFeedback?, OIDSelection?)),
Dependency?)>
```

These fields are pointers to applied patterns that constrain the data a user can enter to supply arguments for a Service IU. The Argument.AppliedPatterns describes the patterns that can be applied for an argument to constrain its behavior. If the domain (data-type) of the argument is a simple-type, the Introduction and Defined Selection Patterns are applicable (optionally). However, if the domain is a object-valued-type the Supplementary Information and OIDSelection are applicable. In both cases, the Dependency Pattern is applicable.

```
<!-- Applied patterns for Filter Variables ============= -->
<!ELEMENT FilterVar.AppliedPatterns ((Ref.Introduction? |
Ref.DefinedSelection?) |
(OIDFeedback?, OIDSelection?))>
```

These fields are pointers that point to elemental patterns that constrain filter variables. The FilterVar.AppliedPatterns describes the patterns that can be applied for a filter variable to constrain its behavior. If the domain (data-type) of the variable is a simple-type, the Introduction and Defined Selection Patterns are applicable (optionally). However, if the domain is a object-valued-type the Supplementary Information and OIDSelection are applicable.

```
<!-- OID Selection ============== -->
<!ELEMENT OIDSelection (#PCDATA)>
```

The OIDSelection element refers to a name of a Population Interaction Unit used for searching objects. It is an application of the Population IU in the context of an argument in order to provide functionality to select objects. It is used from arguments and filter variables of object-valuated type.

```
<!-- View (Subset of the model to derive a
user interface) =========== -->
<!ELEMENT View (Interface*, HAT?)>
<!ATTLIST View
   Name CDATA #REQUIRED
   Alias CDATA #IMPLIED
>
```

A view is a subset of the full system to create smaller user interfaces to show only a part of the full system. A view is composed by a list of interfaces and optionally a HAT. As properties it has a name (unique in the specification scope) and an alias (visual label). Views are defined in the model.

```
<!-- Interface (for visiblity permisions) ============== -->
<!ELEMENT Interface (Visible Attribute*, VisibleService*,
VisibleRole*)>
<!ATTLIST Interface
   ServerClass CDATA #REQUIRED
   ClientClass CDATA #REQUIRED
>
```

Each Interface describes the permissions for one class (ClientClass) with respect to another class (ServerClass). The permissions include a list of attributes, a list of services, and a list of roles of the server class. The semantics are: these lists are the visible attributes, executable services, and navigable roles for the Client Class in the Server Class.

```
<!ELEMENT VisibleAttribute (#PCDATA)>
<!ELEMENT VisibleService (#PCDATA)>
<!ELEMENT VisibleRole (#PCDATA)>
```

Each Visible* element contains the name of an Attribute, Service or Role, respectively.

Required Data for IUS.

Definition of Service IU

Required Fields

A service IU data structure can be seen a data structure within the data structure that defines a service. Its encapsulated relationship acts as an implicit pointer to the service to which it is associated. As basic prerequisite for defining a Service IU, a service must exist which implies that a class for which the service is defined must also exists. A Service IU is defined for a given Service (see cardinalities 1:1 in the definition relationship 1302 at FIG. 14).

In order to define a Service IU a name must be provided. This name must be unique in the class scope the service belongs to.

Optional Fields

An alias (a visual label for the final user) for the Service IU, a help message, and an Argument Grouping Pattern (specifying how the arguments are grouped) can be optionally provided in the definition. Later, other elemental patterns will be used for constraining the service arguments related to the given service.

Definition of Instance IU

Required Fields

As basic prerequisite for defining an Instance IU, a class must exist. An Instance IU is defined for a given Class (see cardinalities 1:1 in the definition relationship 1302 for Instance IU 1500 at FIG. 15). The compulsory fields needed for the specification of an Instance IU are a Display Set (specifies what attributes will be presented in the scenario or displayed in the final user interface) and a name for the defined Instance IU. The name must be unique in the class scope.

Optional Fields

As optional fields, Actions and Navigation Patterns can be provided to indicate the available actions and navigation for the final user in the user interface. Alias and a Help message are also optional to provide a caption and additional explanations, respectively.

Definition of Population IU

Required Fields

As basic prerequisite for defining a Population IU, a class must exist. A Population IU is defined for a given Class (see cardinalities 1:1 in the definition relationship 1302 for Population IU 1501 at FIG. 15). The compulsory fields needed for the specification of a Population IU are at least one Display Set (specifies what attributes will be presented in the scenario) and a name for the defined Population IU pattern. The name must be unique in the class scope.

Optional Fields

As optional fields, Filters, Order Criteria, additional Display Sets, Actions, and Navigation Patterns can be provided to indicate the available searching methods, sort capabilities, alternative presentation of information, actions and navigation for the final user in the user interface, respectively. Alias and a Help message are also optional to provide a caption and additional explanations.

Master/Detail IU

Required Fields

As basic prerequisite for defining a Master/Detail IU, a class must exist. A Master/Detail IU is defined for a given Class (see cardinalities 1:1 in the definition relationship 1302 for Master/Detail IU 1601 at FIG. 16). The compulsory fields needed for the specification of a Master/Detail IU are a master IU (specifies the IU acting as a master component in the master detail) and at least one detail IU (specifies a IU acting as a detail). The name must be unique in the class scope.

Optional Fields

As optional fields, more that one Detail IU can be specified in order to define complex master/details. Alias and a Help messages are also optional to provide a caption and additional explanations for user interface in run time.

Required Data for Classes.

Definition of a Class

Required Fields

There is no prerequisite to create a class. Classes can always be created in a specification. However, the name must be unique in the specification scope (in other words, no other class in this specification can have the same name). When defining a class the analyst must provide such a unique name.

Optional Fields

In a class as optional fields several properties can be defined like Filters, Order Criteria, Display Sets, Actions, Navigation Patterns, Instance IUs, Population IUs, and Master/Detail IUs. Classes can also have attributes (object properties), services (methods to change the value of the attributes of the objects), defined patterns (default Supplementary Information and default Population and Instance IUs), and an alias (a visible label for the final user in the user interface).

Required Data for Services.

Definition of a Service

Required Fields

A prerequisite to create a service is to have a class or which the service is defined. Services must be defined in a class. The service name must be unique in the class scope (in other words, no other service defined in this class can have the same name). When defining a service the analyst must provide such a unique name.

Optional Fields

Optional fields for services are an alias (a visible label for the final user in the user interface), a list of arguments (the input/output parameters for the method) and a list of defined patterns. The patterns defined for a service consist of a list of Service IUs defined for the given service.

Required properties must be provided by the analyst when building the User Interface Model to maintain a complete specification. Therefore, data that is compulsory is presented at editing time of the formal specification by the editor as compulsory and no further progress will be allowed until the compulsory data is supplied by the analyst in the pattern creation time (editing the specification).

However, optional fields need not be provided during the pattern creation time (editing the specification). In any moment of the specification editing process, the analyst can change this optional data to complete it or to remove it.

The validation process checks that all compulsory data is present. Names (identifiers) are checked, among other things to make sure they are unique to ensure there is no ambiguity.

D. Specification Editor.

The specification editor is a computer program which executes on a computer in an automatic code generation system which is used by an analyst to build a specification in a formal language of the user interface and the rest of the program for which code is to be automatically generated.

A formal language is a mathematical language which has semantics in which every term has one and only one meaning. It may also have rules of syntax which can be used to validate formal specifications written in the formal language.

The preferred embodiment of the editor tool will be described in this section.

Figure 24:
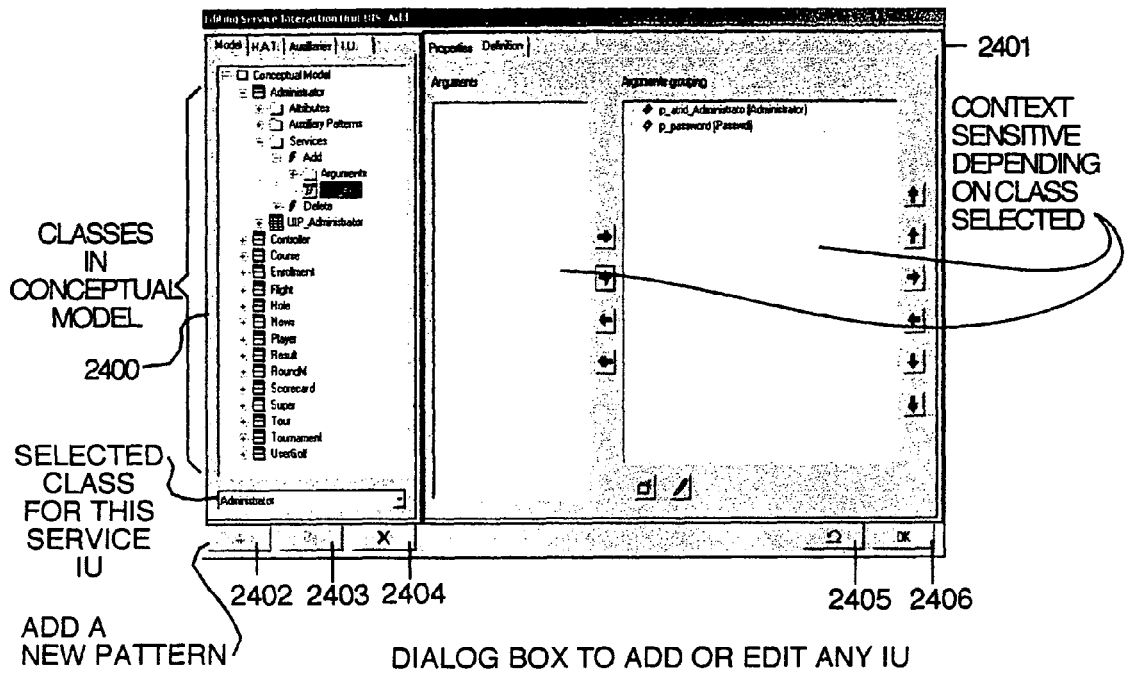
FIG. 24 is a view of main window in the user interface of the editor tool for building User Interface Models.

The User Interface Model Editor is embedded in an object oriented modeling tool. FIG. 24 shows the main window used for editing the User Interface Specification. This window can be accessed using the following ways:
1. Using the Main Menu> Project> User Interface Model.
2. Selecting a class and then choosing the Interface option in a popup menu.
3. Clicking the User Interface Model button in the main toolbar.

FIG. 24 shows an editor framework for editing the User Interface Models. On the left pane 2400 a tree control embedded in a tab control shows the defined elements in the Conceptual Model of the software to be built using a continence hierarchy. In this tree, views, classes, attributes, services, arguments, and patterns are displayed selectively by expanding the various levels of the tree. For example, the Administrator class is expanded to show it has attributes, auxiliary patterns and services levels. The services level is expanded to show it has a service called Add which has within it a level for Arguments of the service and a Service IU named UIS_Add. It also has a service called Delete.

Whenever an object in the left tree 2400 is selected, its properties appear on the right pane 2401 organized also in tabs. For example the Service ID UIS_Add is selected and it is seen in pane 2402 that this Service ID has been enriched with an Argument Grouping elemental pattern to group arguments for the service Add. The analyst can change here the properties for a given pattern.

The left pane 2400 contains four different tabs. Each tab contains a different form of organizing (indexing) the model data. Depending of the task, the analyst will select one or other. Model tab shows classes and patterns defined for such classes. HAT tab shows the HAT patterns per view. Auxiliaries tab shows the Introduction and Defined Selection Pattern. Eventually, IU tab shows the Interaction Units classified by type and class.

Button 2402 is used for creating new patterns (instances from a given pattern). Button 2403 is used for cloning a pattern; in other words, create copy from a previous existing pattern. Button 2404 is used for deleting an existing pattern. Button 2405 is used for undoing the last action performed. Finally, button 2406 is used to close the User Interface Specification and save changes.

Figure 25:
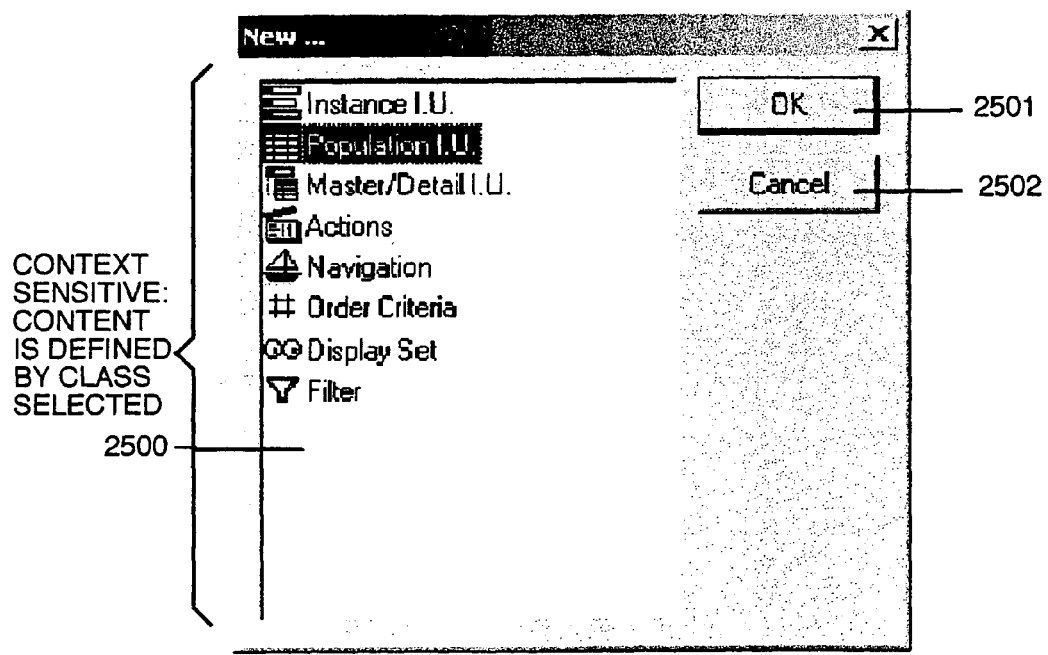
FIG. 25 is a view of the New Pattern window in the user interface of the editor tool.

Whenever the user clicks on the button 2402, a context-sensitive window appears showing the patterns that can be created in such a context. For example, FIG. 25 shows the patterns that can be created for a class when a class is selected in the left pane of FIG. 24 and button 2402 is selected. When the analyst selects a class in the tree 2400 and press the button 2402, FIG. 25 will appear showing the patterns that can be defined in a class scope: Instance IU, Population IU, Master/Detail IU, Actions, Navigation, Order Criteria, Display Set, and Filter. Using the listbox 2500 the analyst can select a pattern type to be created and press OK button 2501 to confirm the operation or press the Cancel button 2502 to undo this action and close the window.

Referring to FIG. 24, the right pane 2401 is context sensitive and contains different tabs depending on the object currently selected. FIG. 26, FIG. 27, FIG. 28, and FIG. 29 are examples of tab pages displayed in this right pane 2401 when a Population IU (FIG. 26 and 27), a Filter (FIG. 28) or a Dependency Pattern (FIG. 29) is selected.

Figure 26:
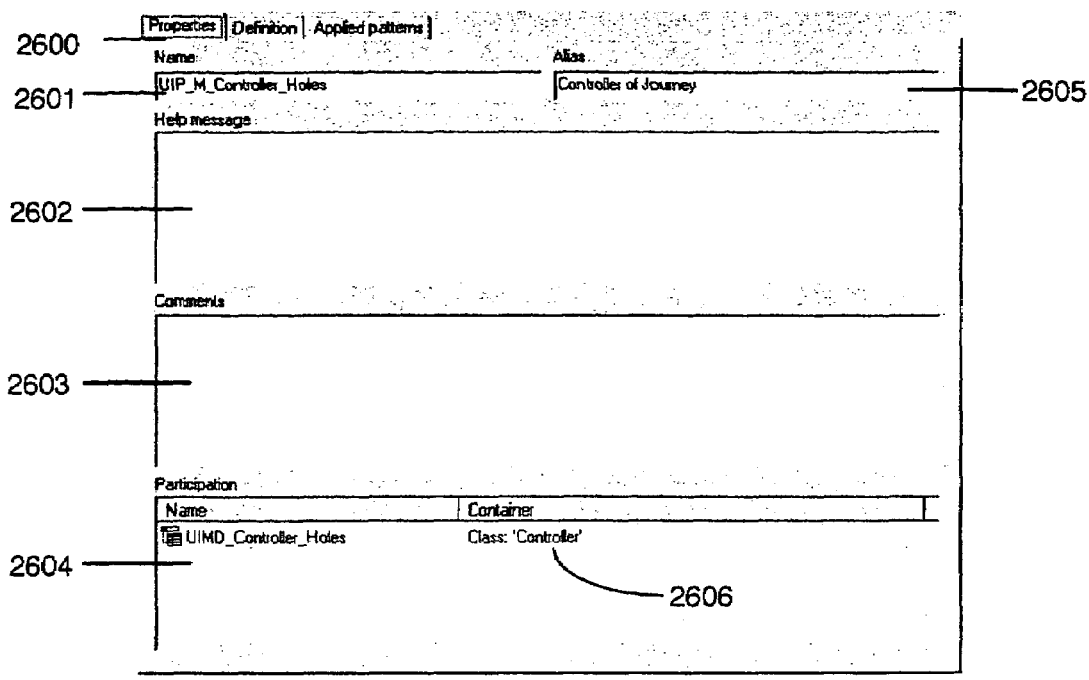
FIG. 26 is a view of the Properties Tab in the user interface of the editor tool.

FIG. 26 shows the dialog box which opens when the Properties tab 2600 is selected. When the analyst creates a pattern, this tab allows entry-fields to provide a name for the pattern 2601, an alias 2605, a help message 2602, and comments 2603. Additionally, the listview control 2604 shows the usage of the patterns in other parts of the model.

Figure 27:
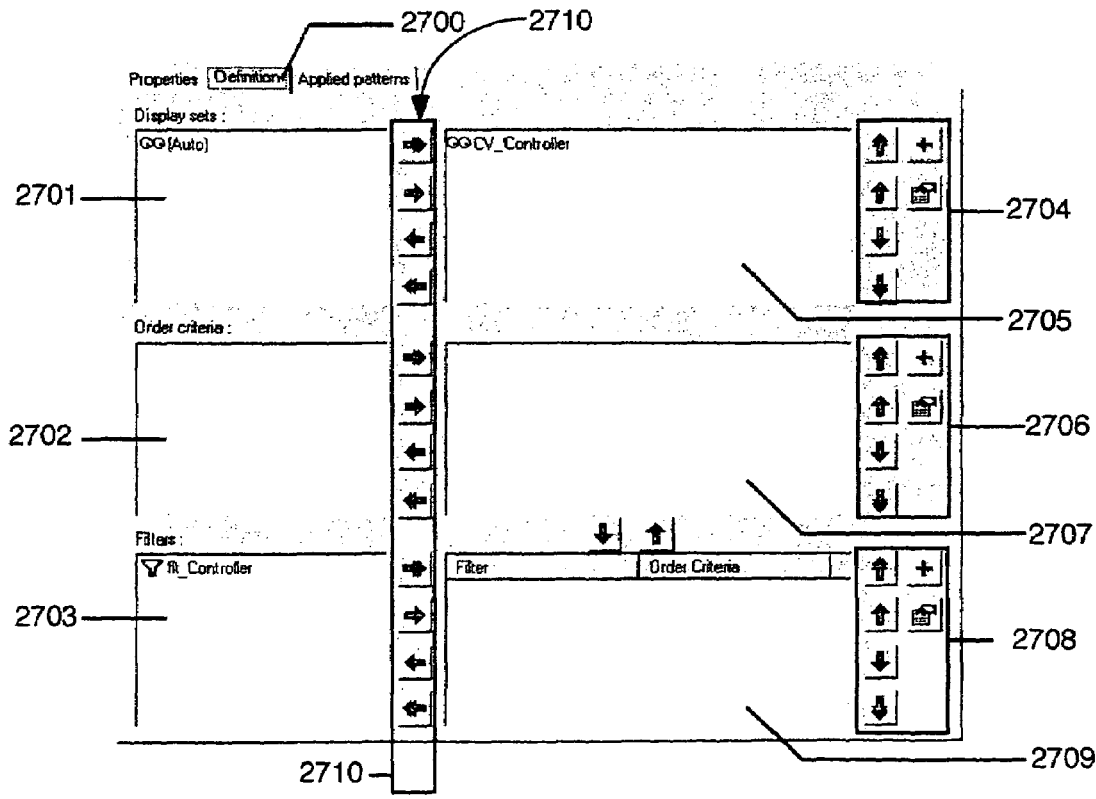
FIG. 27 is a view of the Definition Tab in the user interface of the editor tool.

FIG. 27 shows the dialog box that opens when the Definition tab 2700 is selected. This tab is used for defining a Population IU. Here the analyst has a list of available Display Sets 2701, Order Criteria 2702 and Filters 2703. Using the set of buttons 2710, the analyst can select (include) the item needed in the corresponding controls 2705, 2707, and 2709. These last referred controls 2705, 2707, and 2709 contain the items that define a Population IU pattern as supplied by the analyst.

Buttons 2710 are grouped in three vertical sets of buttons of four buttons per set. The semantic or function of each button per group described top-down is the following: the first button (double right arrow) moves all items from left to right (Select All behavior to select all items in the left pane and move them to the corresponding right pane), second button (right arrow) moves one item from left to right (Select One behavior), third button (left arrow) moves one item from right to left (Unselect One behavior) and finally the fourth button (double left arrow) moves all items from right to left (Unselect All behavior). The rest of the groups work in the same manner.

Groups of buttons 2704, 2706 and 2708 works in the same manner. The buttons described in a top-down left-right way perform the following: On the fist column there are four buttons: the first button (double up arrow) moves the selected item in the left control (2705, or 2707, or 2709, respectively) to the top (Move First behavior), the second button (up arrow) moves the selected item in the left control one position up (Move Up behavior), the third button (down arrow) moves the selected item in the left control one position down (Move Down behavior), the fourth button (double down arrow) moves the selected item to the bottom (Move Last behavior). The second column contains two buttons: the first one button (plus sign) is used to create a new pattern, and thesecond button is used to edit the current selected pattern (in the left control).

Figure 28:
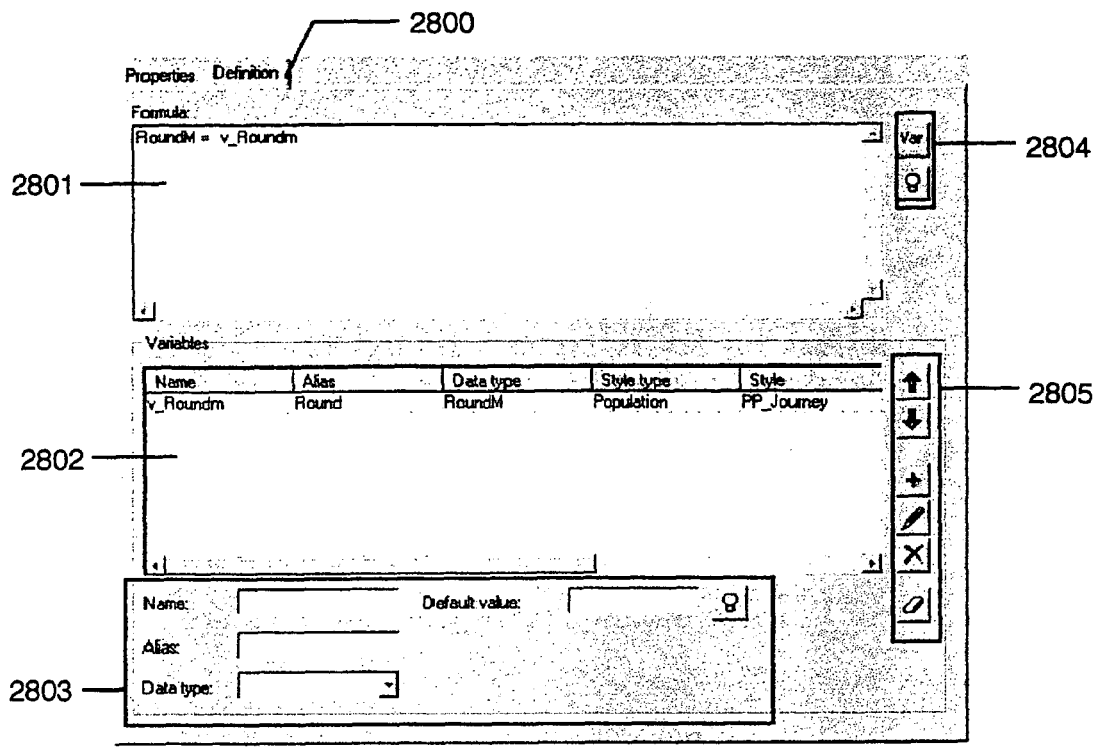
FIG. 28 is a view of the edit window for filters in the user interface of the editor tool.

Referring to FIG. 28, the Definition tab for filters is shown 2800. A filter is defined by expressing a formula. The field 2801 provides an input control that allows the analyst to write such a formula following the syntax used for filters (see Appendix Filter BNF Grammar).

Control 2802 shows the defined filter variables for this filter. Using the set of controls 2803 the analyst can create new filter variables that will appear in listview control 2802.

Buttons in toolbar 2804 are used for (top-down): VAR is used to copy & paste the name of the selected filter variable in control 2802 to control 2801. The second button (lamp) is used to display a wizard that helps to build the filter formula.

Buttons in toolbar 2805 are used for (top-down): the first button moves one position up the current selected filter variable in 2802, the second button moves one position down the current selected filter variable in 2802, the third button add a filter variable, the fourth button edits the current selected filter variable, the fifth button deletes current selected filter variable and finally, the sixth button cleans all the fields in 2803.

Figure 29:
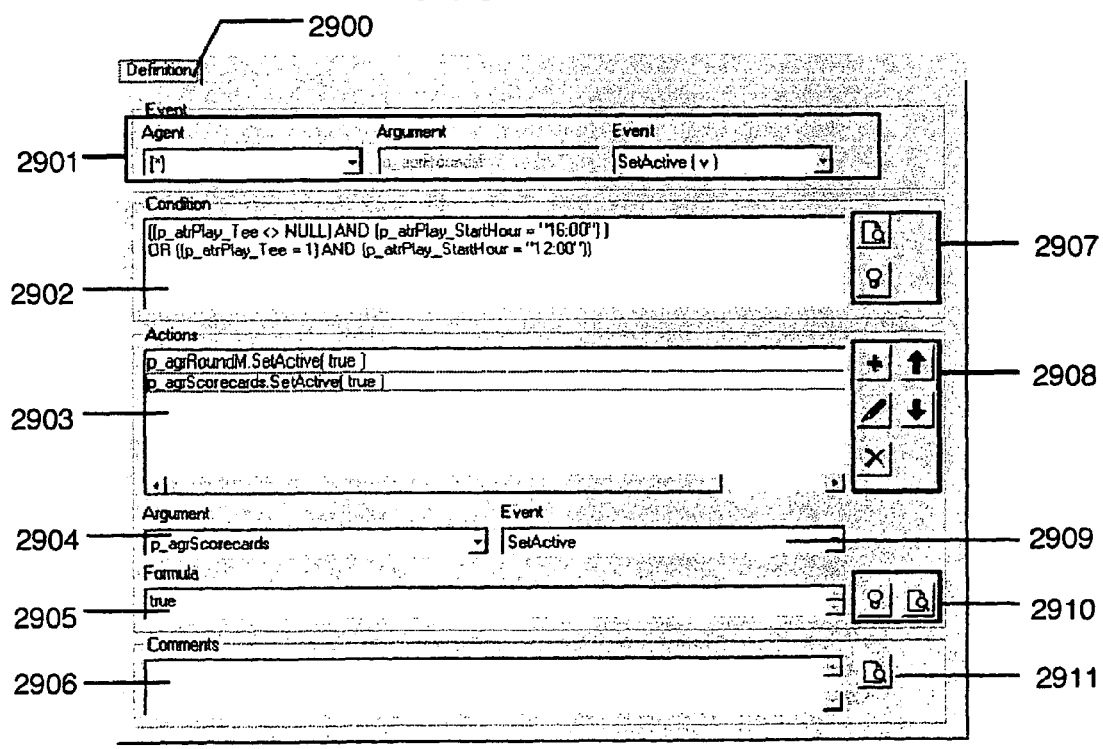
FIG. 29 is a view of the edit window for dependency rules in the user interface of the editor tool.

Referring to FIG. 29, a dialog box which the editor displays when the analyst selects a Definition tab for a selected Dependency Pattern is shown at 2900. A Dependency Pattern is composed of a set of ECA rules (Event-Condition-Actions). The syntax of such as formulas is defined in the Appendix Dependency BNF Grammar.

The Event part of a rule can be defined using the controls 2901: selecting the agent (all '*', 'user' or 'internal'), the argument and the event: (SetActive(v) or SetValue(v)).

The Condition part of the rule can be specified by the analyst in field 2902. Buttons in 2907 toolbars helps in these tasks providing a bigger edit window (top button) or providing a context-sensitive wizard to help build the formula (lower button).

The Actions part of a rule is defined in control 2903. A list of ordered, already existing actions 2903 are displayed for the current rule. Toolbar 2908 is used to (top-down, left-right order) create, edit, delete, move up and move down the actions, respectively.

Auxiliary controls 2904, 2905, and 2909 are used to define actions. In the same way as 2907, toolbar 2910 provides a bigger space for editing the formula and a context-sensitive wizard.

Finally, control 2906 allows the analyst to attach some comments to the rule. Button 2911 provides a bigger space for editing such comment.

E. Graphical Notation.

Graphical representations are more convenient and easy to work with for an analyst when developing big-sized systems than using textual representation. In this way, the tool implementing the method uses a graphical notation that makes easy the understanding of the concepts involved. This feature is important to improve the scalability of the method when it is applied to large systems.

The graphical notation used consists on a layered diagram using three types of diagram (one per patterns level). Each of them is a refinement from another one.

Figure 17:
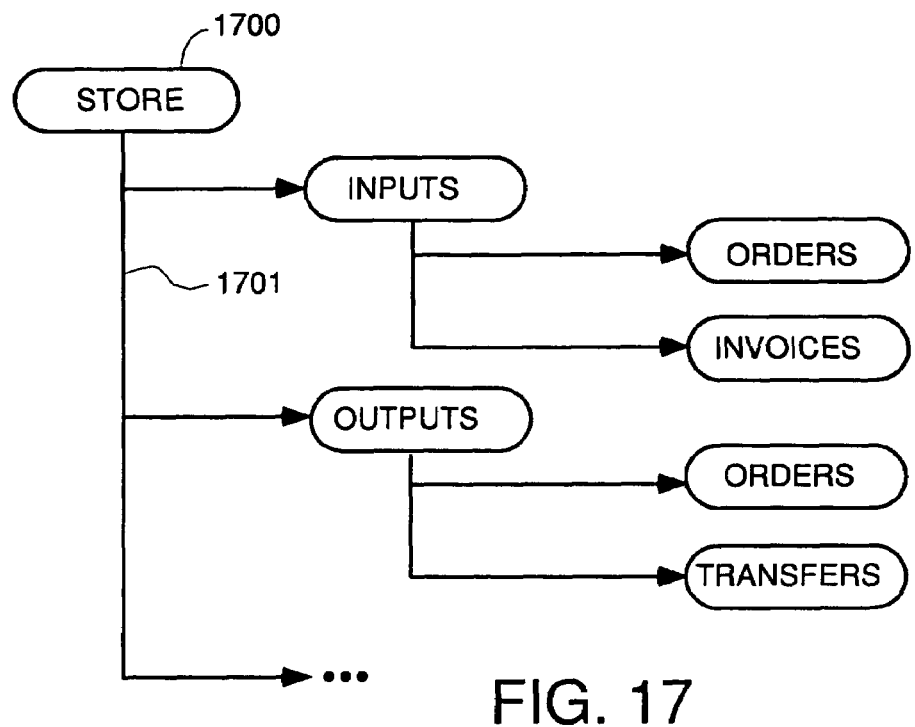
FIG. 17 is an example of the graphical notation of level 1.

GN1. An example of diagram for level 1 as shown in FIG. 17 is a tree expressing the structure of the Hierarchical Action Tree Pattern. Bubble 1700, represents the nodes in the tree, whereas arrows 1701 represents the child relationships in the tree and links with target Interaction Units.

GN2. The graphical notation for level 2 is a directional graph composed by interaction units acting as boxes and navigation links acting as arrows.

Figure 18:
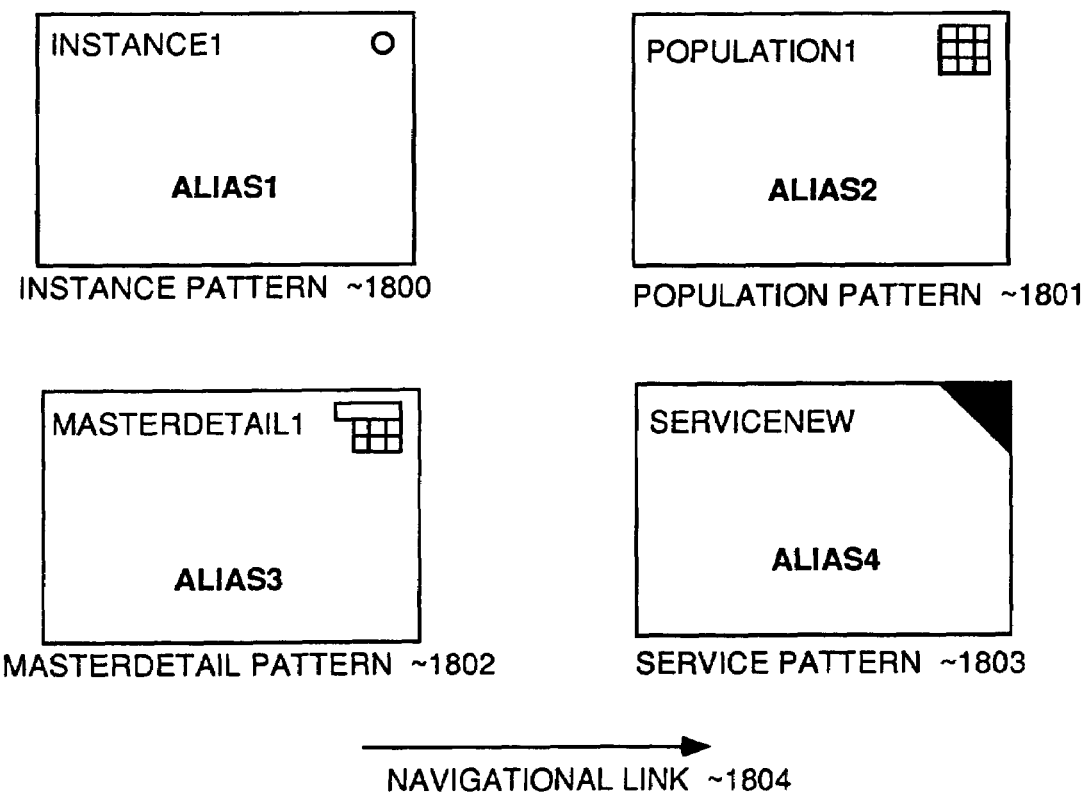
FIG. 18 shows the primitives for graphical notation of level 2.

The primitives of the graphical notation are shown in FIG. 18. Interaction Units are represented as boxes with a small glyph in the right-upper corner. The glyphs employed are a circle for Instance IU 1800, a grid for Population IU 1801, a rectangle and a grid for the Master/Detail IU 1802 and a black triangle for Service IU 1803. Arrows are used for navigational links 1804.

Figure 19:
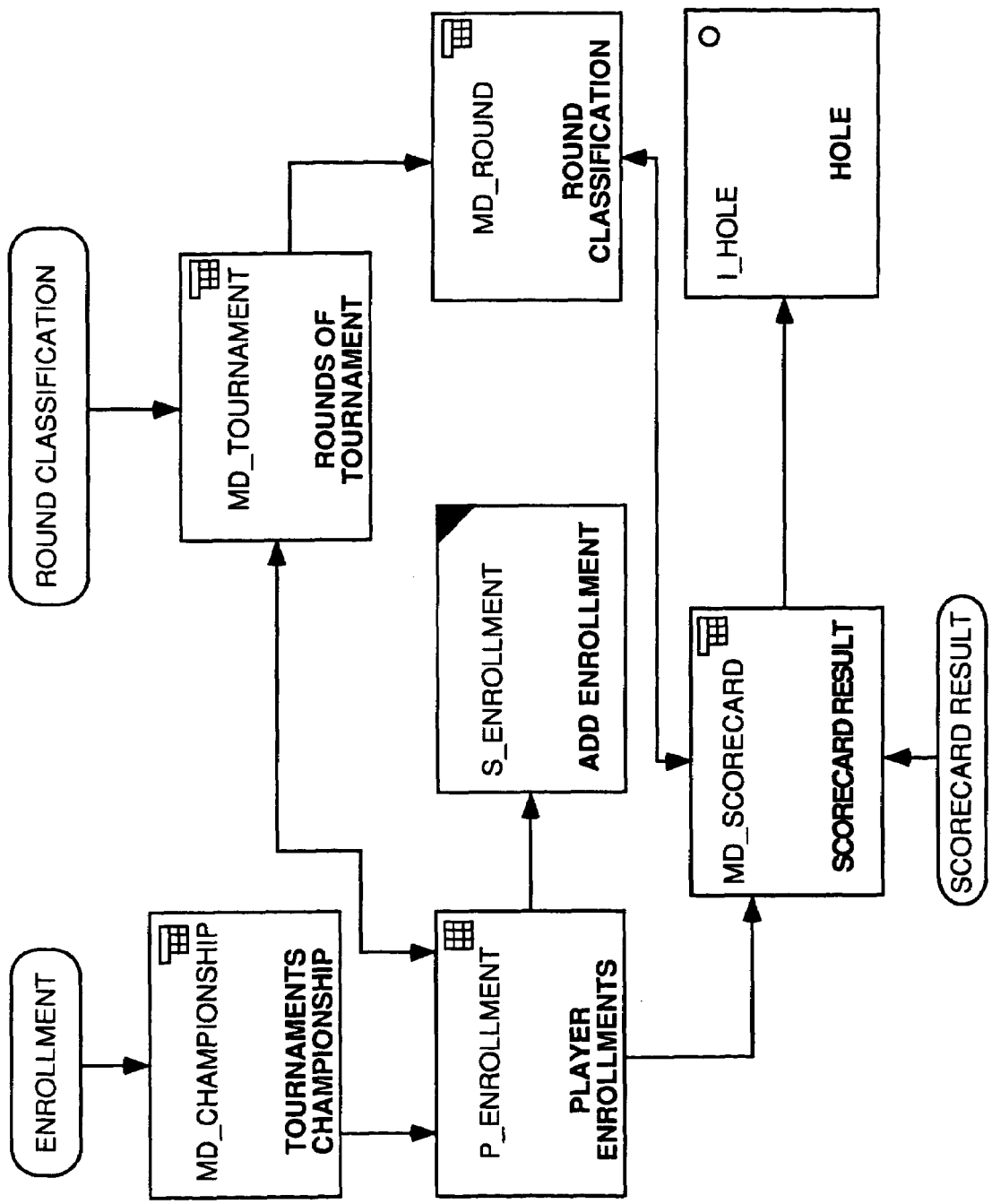
FIG. 19 is an example of the graphical notation of level 2.

An example of the Navigational Diagram showing how navigation between different IU patterns is implement for an example golf course tournament management program is shown in FIG. 19. The diagram shows the scenarios, i.e., Interaction Unit types that have been specified to be present in the User Interface and the navigational relationship among them.

GN3. The last diagram, FIG. 20, contains the graphical notations used to represent some primitives of the lower level. This type diagram is used to indicate the concepts used in the definition or articulation on a given IU. FIG. 20 shows the graphical representation for each primitive: the representation for Display Sets 2000, Filters 2001, Order criteria 2002, Navigation 2003 and Actions 2004 are shown.

Figure 21:
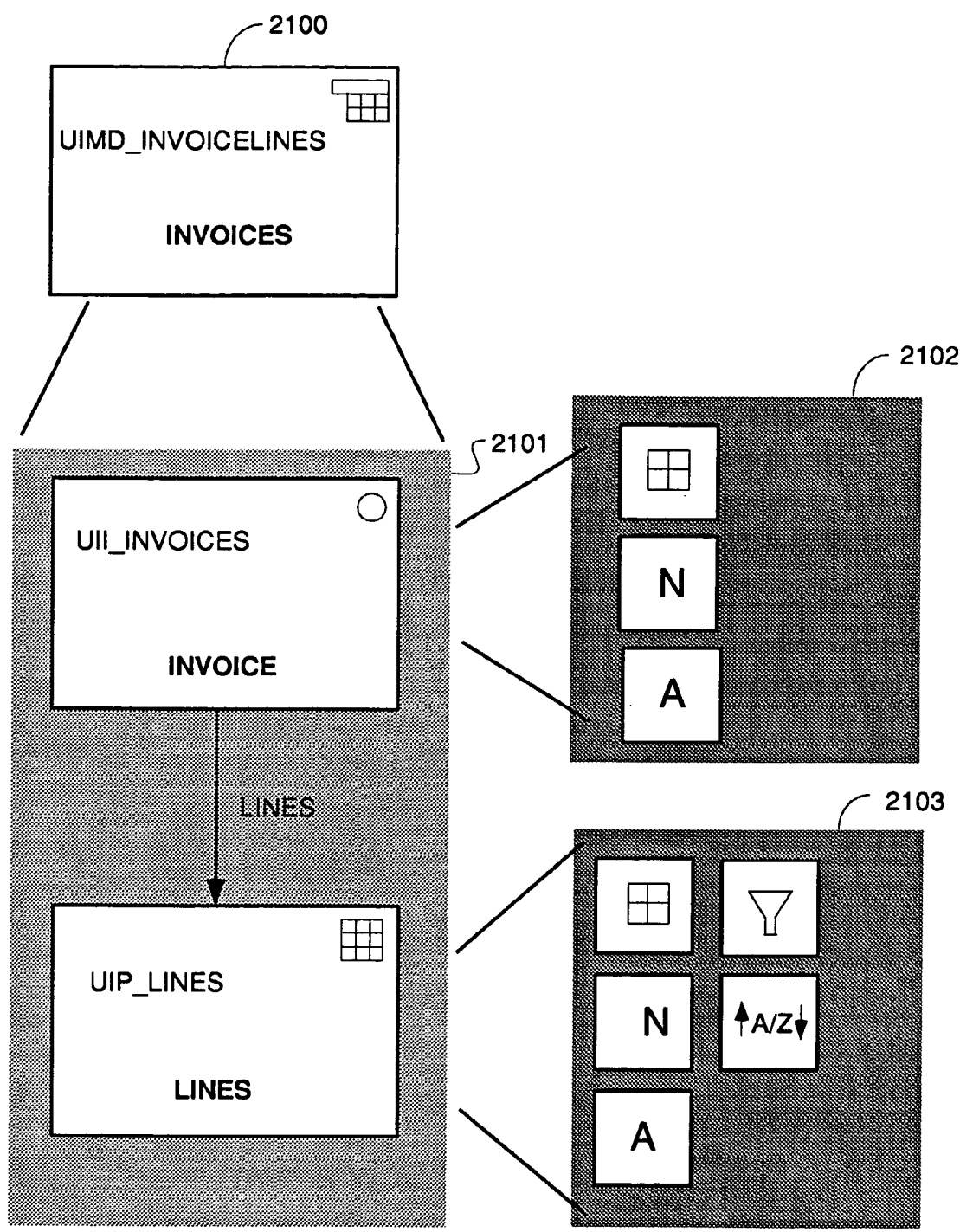
FIG. 21 is an example of decomposition of diagrams using the graphical notation.

FIG. 21 shows an example of decomposition of the diagrams from a general one to refined ones. 2100 is an example of diagram showing a Master/Detail IU. If the user needs to inspect IU, he can double click over the box and a second diagram will appear 2101 showing the components of the Master/Detail IU. Once again, clicking with the mouse over a box, the corresponding level three diagram will appear 2102 or 2103.

F. Validation Rules.

The specification must be validated (FIG. 1, 116) before the code generation phase. This process ensures the specification in correct and complete enough as input for code generators.

The User Interface Specification is validated checking a set of rules. Each rule can be satisfied or not. If not, there are two categories of fault values: errors and warnings. Errors are considered as fatal ones: the specification is no valid. On the contrary, warnings are minor errors that do not impede code generation. Nevertheless, both errors and warnings are shown to the user in order to inform him about the quality of the specification being produced and its consequences.

A subset of key rules follows:

R1. The Service IU name is unique in the Service Scope.
R2. The Population IU name is unique in the Class Scope.
R3. The Master/Detail IU name is unique in the Class Scope.
R4. A Filter name is unique in the Class Scope.
R5. An Order Criterion name is unique in the Class Scope.
R6. A Display Set name is unique in the Class Scope.
R7. A Navigation name is unique in the Class Scope.
R8. An Actions name is unique in the Class Scope.
R9. Check that all referenced objects exist.
R10. Every HAT has a root node.
R11. Every HAT node has a label and children nodes or has a reference to a target IU and zero children.
R12. The Instance IU name is unique in the Class Scope.
R13. The Instance IU contains a reference to an existing Display Set.
R14. The Population IU contains at least one reference to an existing Display Set.
R15. Every Master/Detail IU has a master component.
R16. Every Master/Detail IU has at least one detail component.
R17. The navigational formula expression in each Detail is valid.
R18. Every Filter has a formula.
R20. Every Display Set has at least one element.
R21. Every Order Criteria has at least one element.
R22. Every Navigation has at least one element.
R23. Every Actions pattern has at least one element.
R24. The navigational formula expression in each Navigation item is valid.

A class scope means: all filters defined for class A are in the A scope. Filters defined for A can not collide with names. In other words, it is not possible to have two filters named F1 for class A.

However it is possible to have a filter F1 denied for class A and at the same time a filter F1 defined for class B. In this last case, the names are unique using the class name (A.F1) & (B.F1).

G. Generation Process.

The Generation Process is implemented by a program which transforms a specification into a source code for a programming language to implement a user interface satisfying the requirements gathered in the specification.

Figure 22:
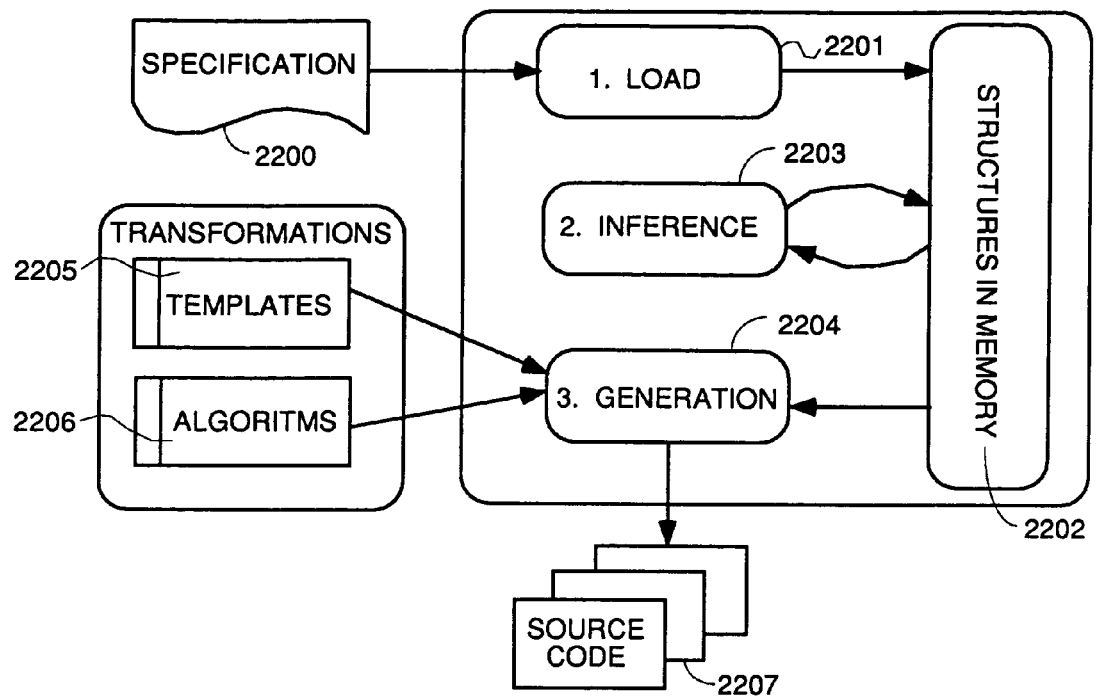
FIG. 22 is a block diagram showing the process of code generation from specifications.

FIG. 22 shows a flow chart of the generation process. The validated formal language specification 2200 is loaded in 2201 in a structure in the computer memory. Depending of the origin of the data (XML, database, repository, plain binary file, etc.) the loading code can vary 2201. However, the structure in memory 2202 does not vary. Therefore, the loader 2201 decouples the generator from the format and type of data in the formal specification data source.

The memory structures 2202 are a set of classes and structures coded in C++ (or any other programming language) implementing the various building blocks of the meta-model. In other words, the structures in memory 2202 are complex data types in C++ or any other target computer code of various building blocks in the meta-model which serve as templates or starting points and which are filled in accordance with the specifics of the actual model built by the analyst. The goal of the translation process is to fill these structures with the information of a given model created by the analyst using a loader 2201 that reads the specification using a reading API (Application Programmer Interface) and populates the appropriate parts of the memory structures 2202 with the read information.

Once the specification is loaded in memory, the inference process 2203 starts. The inference process checks the structures in memory detecting missing information and completing it with derived information and making some preliminary calculations. The inference process will be described later.

On the loading and inference process having been completed, the generation process 2204 starts. The generation process uses a set of transformations consisting of templates 2205 and algorithms 2206. The algorithms 2206 review the memory structures and for each element found, a template of computer code that can implement that type of element is selected and instantiated for the specific articulation of the element using the formal specification data for that element. Once a template has been instantiated, the resulting document is dumped to disk as output file of compilable source code in the target language.

Figure 23:
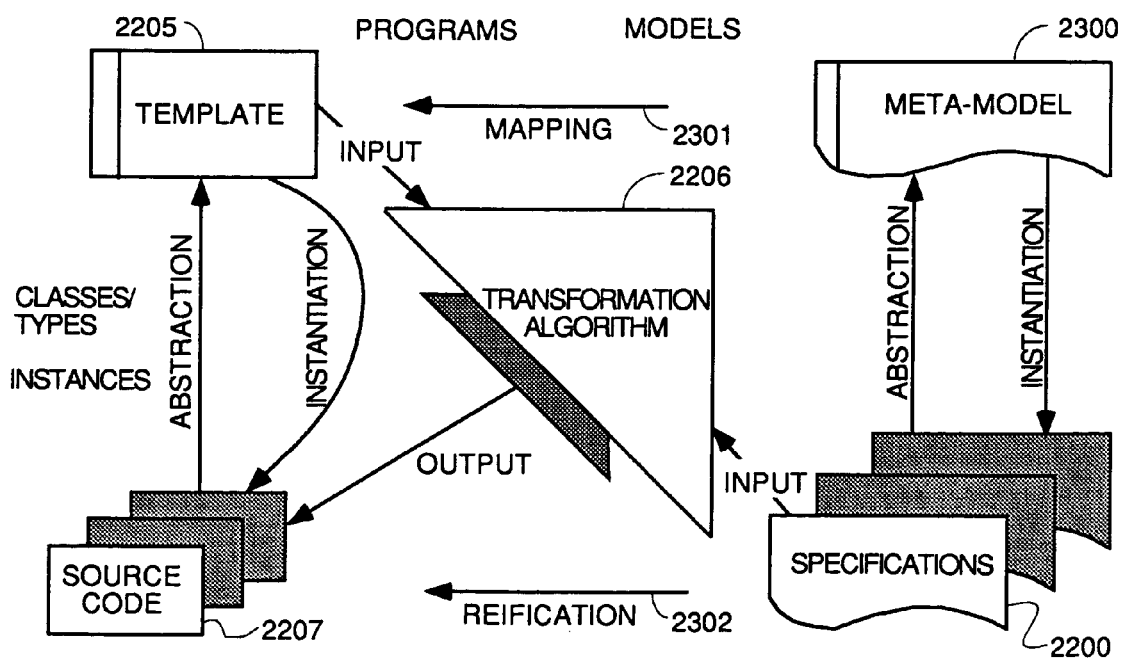
FIG. 23 is a block diagram showing a detail of the code generation using specifications and templates to produce code.

FIG. 23 shows a detailed view of the generation process based on templates. The meta-model 2300 is the genus of all the specifications 2200 in the sense that every building block of the model built by the analyst of the desired program is a building block in the meta-model and that includes all the patterns which are used to specify in the formal specification the type of user interface and articulate it for each class. In the same way, a template 2205 is the genus of all the documents (source code) that it can produce 2207. In other words, the templates are source code patterns that can do various things and are the elements or building blocks from which the final code in source code output file 2207 is built after instantiation using model-specific information from the formal specification. The Transformation Algorithm 2206 uses the specification data to instantiate a given template with data from the specification. As a result, a compilable source code file that implements the desired program is produced.

When the generation process finishes applying the transformation algorithms, the set of source files produced as output constitutes the application source code 2207.

G.1. Mappings

Templates are created from mappings 2301. A mapping establishes a correspondence between meta-model elements or building blocks and their implementation in a given high level computer language such as C++.

A complete set of mappings has to be established in order to generate a user interface for a given language. We have successfully developed such mappings and implemented the corresponding code generators for Visual Basic, Java (desktop environments) JSP, Cold Fusion, and ASP (web environments). Furthermore, a study for Pocket PC devices shows that it is feasible to have a complete mapping for pervasive devices or phone cells.

As examples, the mappings for Visual Basic and Cold Fusion languages are going to be presented.

The following table shows a list of mappings for the Visual Basic language:

| Model's Concept or Behavior | Visual Basic (VB) Component |
| --- | --- |
| View | MDI Parent Form/VB Application |
| Hierarchical Action Tree | Application Menu |
| Interaction Unit | MDI Child Form |
| Service IU | MDI Child Form with input fields |
| Instance IU | Generic User Control Instance |
| Population IU | Generic User Control Population |
| Master/Detail IU | Implementation by composition of Instance and Population User Control Components |
| Argument (simple type) | Generic User Control Input Field |
| Argument (object type) | Generic User Control OIDSelector |
| Filter | Generic User Control Filter |
| Filter Variable | Generic User Control Input Field |
| Actions | Toolbar & Popup menu |
| Action Item | Button & Popup item |
| Navigation | Toolbar & Popup menu |
| Navigation Item | Button & Popup item |
| Display Set | Grid & label sequence |
| Introduction | VB code for data validation |
| Defined Selection | Drop Combo-box or radio button |
| Service Confirmation | Button labelled as 'OK' & VB code for data validation and service invocation |
| Service Cancellation | Button labelled as 'Cancel' & VB code for form unload |
| Service Invocation | VB code for communications with business layer for service invocation |
| Query | VB code for communications with business layer for query request |
| Data presentation | VB code for data recovery and formatting |

This set of mappings is implemented in the VB translator.

Correspondingly, the mappings for the Cold Fusion language are presented.

| Model's Concept or Behavior | Cold Fusion Component |
| --- | --- |
| View | Frame web page/Web Application |
| Hierarchical Action Tree | Javascript tree or menu-like Flash component |
| Interaction Unit | Web page |
| Service IU | Web page containing a HTML form <Form> |
| Instance IU | Web page with labels showing data values from an object |
| Population IU | Web page showing filters, order criteria, a table with data, actions and navigations |
| Master/Detail IU | Composed web page from Instance and Population pages |
| Argument (simple type) | HTML <InputBox> tag & javascript code for validation |
| Argument (object type) | Composition of text, HTML <InputBox> tag & javascript code for validation |
| Filter | Filter HTML template |
| Filter Variable | HTML <InputBox> tag & javascript code for validation |
| Actions | Set of links |
| Action Item | <A HREF="..."> HTML tag |
| Navigation | Set of links |
| Navigation Item | <A HREF="..."> HTML tag |
| Display Set | <Table> HTML tag or text sequence |
| Introduction | <InputBox> with Javascript code for data validation or similar Java or Flash component |
| Defined Selection | <SELECT> HTML tag or similar Java or Flash component |
| Service | <InputBox type="Submit"> labelled as 'OK' with |
| Confirmation | Javascript code for data validation and service invocation |
| Service Cancellation | <InputBox type="Button"> labelled as 'Cancel' with Javascript code for closing the web page and redirection to another page |
| Service Invocation | Javascript communication code with ColdFusion Server intermediate layer and CFScript code for communication with business logic layer for service request |
| Query | Javascript communication code with ColdFusion Server intermediate layer and CFScript code for communication with business logic layer for query request |
| Data presentation | CFScript code for data recovering and formatting |

In the same way, this set of mappings is implemented in the Cold Fusion translator.

H. Inference Process.

The inference process (FIG. 22, 2203) completes missing information in a model and carries out preliminary calculations to facilitate the generation process 2004.

Information like missing aliases is completed deriving such aliases from other elements in the specification.

The rules for deriving aliases are:

11. If a Class has not got an alias, use its name.
12. If an Argument has not got an alias, use the alias of its related Attribute, if not applicable, use its name.
13. If an Attribute has not got an alias, use its name.
14. If a Service has not got an alias, use its name.
15. If a Service IU has not got an alias, use its Service alias.
16. If a Instance IU has not got an alias, use its Class alias.
17. If a Population IU has not got an alias, use its Class alias.
18. If a Master/Detail IU has not got an alias, use its Class alias.
19. If a Filter has not got an alias, use its name.
110. If an Order Criterion has not got an alias, use its name.
111. If an Action Element has not got an alias, use the alias of the target IU.
112. If a Navigation Element has not got an alias, use the alias of the target IU.
113. If a Detail has not got an alias, use the alias of the target IU.
114. If a child HAT node has not got an alias, use the alias of the target IU.

Some information is converted from an implicit form to an explicit one. In the specification there are conventions for indicating that all the services available are offered in an action pattern, all aggregation relationships are part of a navigation pattern, or all attributes in a class are shown in a Display Set. During the inference process this information is expanded and pre-calculated. The meaning of "all" when selected by the analyst using the editor when articulating an IU (implicit) is translated to an enumerated list containing all the items available (explicit) to be used later in the generation phase. In other words, when "all" is selected to define action patterns, all available services of the class appear in the control window. The same is true for "all" when defining display sets or navigation patterns.

If the HAT is missing in the specification, a HAT is inferred in this point. A tree is created containing a node per class. A node is created per services and interaction units and connected as child nodes below the class node. In this way, the user interface produced will be able to test all the functionality and Interactions Units of the system.

What is claimed is:

1. A process for controlling a computer to provide user interface design tools which a user may invoke to specify primitives from a metamodel which define the type and functionality of a user interface which is to be part of a target computer program to be automatically written, comprising the steps:

(A) controlling said computer to display target program design tools which can be used to define a Conceptual Model of a target computer program to be automatically written, and controlling said computer to receive user input data entered using said design tools that defines said Conceptual Model, said Conceptual Model including at least an object model defining one or more classes of objects each with attributes in the form of data defining the state of said object, said design tools including user interface design tools each of which represents a pattern which is a building block of meta-model used to build the type of user interface needed for said target computer program, some of said patterns being called Interaction Units and some of said patterns called elemental patterns which can be applied to an Interaction Unit, each pattern being a shorthand way to specify a commonly used type of user interface for a computer program which has been identified in the prior art;

(B) controlling said computer to receive a user selection of a class and user selections of an Interaction Unit and one or more elemental patterns specifying a type of user interface for said target computer program for display of data from said selected class and for interaction with a user of said target computer program;

(C) controlling said computer to respond to user selections of said Interaction Unit and one or more elemental patterns by displaying one or more dialog boxes or forms that invite a designer of said target computer program to enter data to articulate said selected Interaction Unit and require said designer to enter all information which is mandatory for the selected Interaction Unit to complete the specification thereof and blocking automated generation of said target computer program until all mandatory information has been correctly entered;

(D) controlling said computer to respond to the selection of said Interaction Unit and entry of data articulating said selected Interaction Unit by creating any type of data structure that embodies a formal language specification that defines said Conceptual Model including said selected pattern for said user interface of said target computer program selected in step B and articulated in step C, said formal language specification containing statements written in a formal language where a formal language has a grammar which strictly controls the syntax and semantics of every valid statement therein such that each formal language statement must be complete and correct, wherein all statements in a formal language have a set of properties that both have to exist and must have a valid value to be deemed correct, and wherein a statement in the formal language specification is complete when there is no missing information in the statement that is required by the rules of syntax and semantics for a statement of that type, and wherein some properties of statements in said formal language are different types of formulas each of which must follow a predetermined syntax and have a process and a set of rules in grammar to validate said formula to ensure said formula is complete and correct, and wherein said formal language specification encodes said Conceptual Model of said target computer program.

2. The process of claim 1 wherein step B further comprises the step of receiving data which names the selected Interaction Unit and further comprising the steps of checking the entered name of said selected Interaction Unit to ensure that said name is unique within the universe of names of objects in a model of said program for which code is to be automatically generated being built using said specification editor.

3. The process of claim 1 further comprising the step of controlling said computer to verify that all compulsory data has been entered in step C.

4. The process of claim 2 further comprising the step of controlling a computer to verify that all compulsory data has been entered in step C.

5. The process of claim 1 further comprising the steps of validating that said formal specification to ensure it is complete and correct using predetermined rules of validation based upon the rules of syntax and semantics of said formal language.

6. The process of claim 5 wherein said validation process categorizes errors as either fatal or warning errors and controls said computer to displays messages to the designer of said target computer program using said automatic code generation system identifying each error and of what type said error is, and further comprising the steps of controlling said computer to receive user input from said designer of said target computer program correcting said errors.

7. The process of claim 1 wherein step B comprises controlling said computer to allow an analyst to define a user interface in terms of a heirarchical action tree (HAT) with one tree for each of one or more of the defined classes with each HAT having a root node and a second level comprised of different types of Interaction Units each of which can, by its selection, define a different type of user interface display and wherein the type of Interaction Units which can be selected in step B for the second level of a HAT comprise Service Interaction Units, Population Interaction Units, Instance Interaction Units and Master/Detail Interaction Units.

8. The process of claim 7 wherein at least some Interaction Units selected for level 2 of a HAT have elemental patterns on level 3 of said HAT that define the types of compulsory data that must be entered in step C to define the content of data that will be displayed in the user interface specified by selection of said Interaction Unit and some Interaction Units on level 2 may have elemental patterns on level 3 of said HAT that define the types of optional data which can be entered to define predetermined aspects of the user interface defined by selection of said Interaction Unit.

9. The process of claim 8 wherein step C further comprises the steps:

(A) when a Service Interaction Unit is selected, displaying dialog boxes or forms which allow a designer of said target computer program to enter data:

(1) which defines constraints on values for arguments a user can enter in the user interface defined by said Service Interaction Unit;

(2) to define a list of all possible values a user can enter for an argument as part of the interface defined by said Service Interaction unit (3) to define supplemental information for object IDs entered by a designer of a user interface for a target computer program which will be displayed when a user of the user interface enters an object ID to identify that object by name or other information that helps the user determined that the desired object has been identified by the data entered into the user interface;

(4) to define event-condition-action (ECA) rules which will control the dynamic behavior of the user interface being specified such that when a user of the user interface of said target computer program enters a value for a field, that value will be checked as an event against the ECA rules, and, if one of the ECA rules has such an event, the condition specified in said rule will be checked to determine if the condition is true, and, if so, the action specified in said ECA rule will be carried out;

(5) to define dependency rules for change services such that whenever said Service IU has valuations of the form <attribute>=<parameter> for each parameter, translator programs in an automatic software production system can detect such a situation and produce default dependency rules to recover the current state of an object before modifying it such that the user can see the starting point state or values of the displayed object's attributes before modifying the state of the displayed object with a change service;

(6) to define argument groupings into a tree structure;

(B) when a Population Interaction Unit-is selected, displaying dialog boxes or forms which allow an analyst to enter data:

(1) to define a mandatory filter condition in a formal language expression that can be evaluated to a boolean condition for each object belonging to the selected class and which controls whether that object or attributes from that object will be visible in the final display specified for the user interface by the selection of said Population Interaction Unit;

(2) to define a mandatory order criterion which controls the order in which objects from said selected class which are selected by said filter condition will be displayed in said user interface of said target computer program;

(3) to define a mandatory display set which comprises an ordered list of expressions describing attributes or visible attributes from said selected class;

(4) to define optional actions which will cause action icons or other displayed means in the user interface for said target computer program specified by the selected Population Interaction Unit which can be invoked by the user of said user interface of said target computer program to cause redirection to a specified target Interaction Unit;

(5) to define optional navigation choices in the final user interface of said target computer program which, when invoked by the user of the user interface of said target computer program, cause navigation to be vectored to a process controlled by computer code generated by said formal language specification generated by selection of a target Interaction Unit and display of whatever data said target Interaction Unit causes said user interface to display;

(C) when an Instance Interaction Unit is selected, displaying dialog boxes or forms which allow an analyst to enter data:

(1) to define a mandatory display set which comprises an ordered list of expressions describing attributes or visible attributes from said selected class;

(2) to define optional actions which will cause action icons or other displayed means in the interface specified by the selected Population Interaction Unit which can be invoked by the user of the interface to cause redirection to a specified target Interaction Unit which causes redirection to a process controlled by computer code generated to implement the user interface specified for said target computer program by selection of said target Interaction Unit which causes said computer to display whatever data was specified for display in the user interface by selection and articulation of said target Interaction Unit, and where articulation of any Interaction Unit means entering data which defines the desired content of the data to be displayed in the user interface caused by selection of the target Interaction Unit;

(3) to define optional navigation choices in the final user interface of said target computer program which, when invoked by the user of the final user interface of said target computer program, cause navigation to a process controlled by computer code generated by the formal language specification generated by selection of a target Interaction Unit and display of whatever data said target Interaction Unit causes said user interface to display;

(D) when a Master/Detail Interaction Unit is selected, displaying dialog boxes or forms which allow an analyst to enter data:

(1) to define at least one master Interaction Unit; and (2) to define at least one detail Interaction Unit linked to said master Interaction Unit.

10. The process of claim 7 further comprising a validation process to ensure said formal language specification of said user interface is complete and correct, comprising the steps of validating that said formal specification using at least the following rules of validation:

R1: the Service IU name is unique in the Service Scope where Service Scope means the universe of all service names for services defined for said selected class;

R2: the Population IU name is unique in the Class Scope where Class Scope means the universe of all Population IU names in said selected class;

R3: the Master/Detail IU name is unique in the Class Scope;

R4: a Filter name is unique in the Class Scope;

R5: an Order Criterion name is unique in the Class Scope;

R6: a Display Set name is unique in the Class Scope;

R7: a Navigation name is unique in the Class Scope;

R8: an Actions name is unique in the Class Scope;

R9: check that all referenced objects exist;

R10: every heirarchical action tree (HAT) has a root node;

R11: every HAT node has a label and children nodes or has a reference to a target IU and zero children;

R12: the Instance IU name is unique in the Class Scope;

R13: the Instance IU contains a reference to an existing Display Set;

R14: the Population IU contains at least one reference to an existing Display Set;

R15: every Master/Detail IU has a master component;

R16: every Master/Detail IU has at least one detail component;

R17: the navigational formula expression in each Detail is valid;

R18: every Filter has a formula;

R20: every Display Set has at least one element;

R21: every Order Criteria has at least one element;

R22: every Navigation has at least one element;

R23: every Actions pattern has at least one element

R24: the navigational formula expression in each Navigation item is valid.

11. The process of claim 8 further comprising a validation process to ensure said formal language specification of said user interface is complete and correct, comprising the steps of validating said formal language specification using at least the following rules of validation:

R1: the Service IU name is unique in the Service Scope where Service Scope means the universe of all service names for services defined for said selected class;

R2: the Population IU name is unique in the Class Scope where Class Scope means the universe of all Population IU names in said selected class;

R3: the Master/Detail IU name is unique in the Class Scope;

R4: a Filter name is unique in the Class Scope;

R5: an Order Criterion name is unique in the Class Scope;

R6: a Display Set name is unique in the Class Scope;

R7: a Navigation name is unique in the Class Scope;

R8: an Actions name is unique in the Class Scope;

R9: check that all referenced objects exist;

R10: every heirarchical action tree (HAT) has a root node;

R11: every HAT node has a label and children nodes or has a reference to a target IU and zero children;

R12: the Instance IU name is unique in the Class Scope;

R13: the Instance IU contains a reference to an existing Display Set;

R14: the Population IU contains at least one reference to an existing Display Set;

R15: every Master/Detail IU has a master component;

R16: every Master/Detail IU has at least one detail component;

R17: the navigational formula expression in each Detail is valid

R18: every Filter has a formula;

R20: every Display Set has at least one element;

R21: every Order Criteria has at least one element;

R22: every Navigation has at least one element;

R23: every Actions pattern has at least one element;

R24: the navigational formula expression in each Navigation item is valid.

12. The process of claim 9 further comprising a validation process to ensure said formal language specification of said user interface is complete and correct, comprising the steps of validating said formal language specification using at least the following rules of validation:

R1: the Service IU name is unique in the Service Scope where Service Scope means the universe of all service names for services defined for said selected class;

R2: the Population IU name is unique in the Class Scope where Class Scope means the universe of all Population IU names in said selected class;

R3: the Master/Detail IU name is unique in the Class Scope;

R4: a Filter name is unique in the Class Scope;

R5: an Order Criterion name is unique in the Class Scope;

R6: a Display Set name is unique in the Class Scope;

R7: a Navigation name is unique in the Class Scope;

R8: an Actions name is unique in the Class Scope;

R9: check that all referenced objects exist;

R10: every heirarchical action tree (HAT) has a root node;

R11: every HAT node has a label and children nodes or has a reference to a target IU and zero children;

R12: the Instance IU name is unique in the Class Scope;

R13: the Instance IU contains a reference to an existing Display Set;

R14: the Population IU contains at least one reference to an existing Display Set;

R15: every Master/Detail IU has a master component;

R16: every Master/Detail IU has at least one detail component;

R17: the navigational formula expression in each Detail is valid

R18: every Filter has a formula;

R20: every Display Set has at least one element;

R21: every Order Criteria has at least one element;

R22: every Navigation has at least one element;

R23: every Actions pattern has at least one element

R24: the navigational formula expression in each Navigation item is valid.

13. A process for specifying at least part of a user interface in an automatic code generation system, comprising:

(1) using an editor program of said automatic code generation system in execution on a computer to create one or more classes and relationships between classes in a model of a target computer program for which code is to be generated by said automatic code generation system, said code to include code executable by a computer to implement a user interface of said target computer program, and controlling said computer to automatically convert said model into a formal language specification of said target computer program including the user interface of said target computer program, said formal language specification written in a formal language which is a mathematical language which has semantics in which every term has one and only one meaning, and which has rules of syntax and semantics which can be used to validate formal language specification statements written in said formal language;

(2) automatically validating said class structure using said rules of semantics and syntax to ensure that predetermined validation rules are complied with;

(3) using said editor to select a class from said one or more classes;

(4) using said editor to select an icon or menu choice representing a desired type of Interaction Unit (IU) which defines a desired type of display of information as part of said user interface of said target computer program, and naming said IU;

(5) automatically validating the naming of said IU to verify that no other IU previously defined for said selected class has the same name;

(6) controlling said computer to respond to selection of said desired type of Interaction Unit to create any type of data structure or database which contains data that embodies a specification in said formal language of the type of user interface portion defined by said selected type of Interaction Unit;

(7) controlling said computer to display dialog boxes, forms or any other type of display which a designer of said target computer program's user interface can interact with to enter at least compulsory data and any desired optional data that defines the desired content of the desired target computer program's user interface display and actions or navigations that a designer of said target computer program using said editor desires a user of the target computer program's user interface to interact with to redirect in the target computer program's user interface to computer code generated by a target IU specified in said action or navigation data which causes said computer to alter the display generated by said target computer program's execution on a computer to display of the data and interaction possibilities defined by said target IU;

(8) controlling said computer to receive user input of at least compulsory data that defines the desired content of the target computer program's user interface display and storing the entered data in the appropriate fields of said data structure which embodies said formal language specification of at least the portion of the target computer program's user interface specified by selection of said desired type of Interaction Unit thereby completing the process of specifying said at least the part of said target computer program's user interface; and (9) controlling said computer to automatically validate said selected IU to verify that all compulsory data at least has been entered, and blocking automatic generation of code of said target computer program until all such compulsory data has been entered completely and correctly.

14. A computer readable medium having computer executable instructions stored thereon which when executed by a computer cause said computer to perform a method comprising:

(1) using a specification editor program to control a computer to display icons and/or menu choices that can be invoked and dialog boxes or forms or any other interactive display which are displayed on said computer which provide tools by which a designer of a target computer program the code of which is to be automatically generated can enter data to define a class structure, select a class structure, designate a class structure, and select an Interaction Unit designating a user interface pattern for a user interface of a designated class in said target computer program, and controlling said computer to receive user input from said designer via said icons and/or menu choices and dialog boxes or forms or any other active display, said data defining a class structure and said data selecting a class for which a user interface of said target computer program is desired;

(2) controlling a computer to receive a selection of an icon or menu choice to select an Interaction Unit which defines the desired type of display of data on displays created by said target computer program from said selected class;

(3) controlling a computer to respond to the selection of said Interaction Unit by creating any type of data structure that embodies a formal language specification of the desired type of user interface for said target computer program and to display dialog boxes or forms that said designer of said target computer program user interface can interact with to supply data which is compulsory to articulation of said Interaction unit and data that defines which data from said class is to be displayed in said selected type of display;

(4) controlling said computer to receive said compulsory data necessary to articulate said Interaction Unit and data input from said designer which defines the desired content of data from said class to be displayed and storing said data in the appropriate fields of said formal language specification of the desired type of user interface represented by said selected Interaction Unit;

(5) controlling said computer to use said rules of syntax and semantics to validate the formal language specification of said Interaction Unit to ensure that all said compulsory data has been completely and correctly entered, and blocking automatic generation of said code of said target computer program until all said compulsory data has been completely and correctly entered.

15. A computer readable medium having computer executable instructions stored thereon which when executed by a computer cause said computer to perform a method comprising:

(1) using a specification editor program to control a computer to display icons and/or menu choices that can be invoked and dialog boxes or forms or any other interactive display which are displayed on said computer which provide tools by which a designer of a target computer program the code of which is to be automatically generated can enter data to define a class structure, select a class structure, designate a class structure, and select an Interaction Unit designating a user interface pattern for a user interface of a designated class in said target computer program, and controlling said computer to receive user input data from said designer via said icons and/or menu choices and dialog boxes or forms or any other active display said data defining a class structure for which a user interface of said target computer program is desired, and automatically converting said data defining said class structure into statements in a formal language specification defining said class structure, said formal language specification written in a formal language which is a mathematically based language having semantics in which everything has one and only one definitions and each statement has a predefined grammar comprised of rules of syntax and semantics which can be used to validate the statement to ensure it is complete and correct;

(2) controlling said computer to use predetermined validation rules based upon said rules of syntax and semantics to automatically validate said formal language statements which define said class structure to ensure that predetermined validation rules are complied with;

(3) controlling said computer to receive user input data entered by said designer using said editor to select a class;

(4) controlling said computer to receive user input data entered by said designer using said editor to select an icon or menu choice representing a desired type of Interaction Unit (IU) for said selected class which defines a desired type of display of information from said class as part of said user interface of said target computer program, and naming said IU;

(5) controlling said computer to automatically validate the naming of said IU to verify that no other IU previously defined for said selected class has the same name;

(6) controlling said computer to respond to selection of said desired type of Interaction Unit to create any type of data structure or database which contains data that embodies a formal language specification written in a formal language specifying the type of user interface portion defined by the selected type of Interaction Unit to be implemented in the code of said target computer program;

(7) controlling said computer to display dialog boxes, forms or any other type of display which said designer can interact with to enter at least compulsory data articulating said selected Interaction Unit and any desired optional data that defines the desired content of the desired user interface display of said target computer program and to specify actions or navigations that said designer desires a user of the user interface of said target computer program to interact with to cause redirection in the final code of said user interface of said target computer program to computer code generated by a target IU specified in said action or navigation data entered by said designer which causes said computer executing said target computer program to alter the display to display of the data and interaction possibilities defined by said target IU;

(8) controlling said computer to store the data entered by said designer in step (7) in the appropriate fields of said data structure which embodies said formal language specification of said selected type of Interaction Unit thereby completing the process of specifying said at least the part of said desired user interface of said target computer program; and (9) controlling said computer to automatically validate said selected IU to verify that all compulsory data at least has been entered, and blocking automatic generation of code of said target computer program until at least all said compulsory data has been completely and correctly entered.

16. A computer apparatus programmed to implement the following method:

(1)) using a specification editor program to control a computer to display icons and/or menu choices that can be invoked and dialog boxes or forms or any other interactive display which are displayed on said computer which provide tools by which a designer of a target computer program the code of which is to be automatically generated can enter data to define a class structure, select a class structure, designate a class structure, and select an Interaction Unit designating a user interface pattern for a user interface of a designated class in said target computer program, and controlling said computer to receive user input from said designer via said icons and/or menu choices and dialog boxes or forms or any other active display, said data defining a class structure and said data selecting a class for which a user interface of said target computer program is desired;

(2) controlling a computer to receive a selection of an icon or menu choice to select an Interaction Unit which defines the desired type of display of data on displays created by said target computer program from said selected class;

(3) controlling a computer to respond to the selection of said Interaction Unit by creating any type of data structure that embodies a formal language specification of the desired type of user interface for said target computer program and to display dialog boxes or forms that said designer of said target computer program user interface can interact with to supply data which is compulsory to articulation of said Interaction unit and data that defines which data from said class is to be displayed in said selected type of display;

(4) controlling said computer to receive said compulsory data necessary to articulate said Interaction Unit and data input from said designer which defines the desired content of data from said class to be displayed and storing said data in the appropriate fields of said formal language specification of the desired type of user interface represented by said selected Interaction Unit;

(5) controlling said computer to use said rules of syntax and semantics to validate the formal language specification of said Interaction Unit to ensure that all said compulsory data has been completely and correctly entered, and blocking automatic generation of said code of said target computer program until all said compulsory data has been completely and correctly entered.

17. A process for creating a formal language specification of a desired user interface for a target computer program being modelled, said formal language specification being created in a formal mathematically based language with semantics in which every term has one and only one meaning and in which each statement has rules of syntax and semantics that can be used to validate said statement, comprising the steps:

(1) controlling a computer to display design tools which can be invoked to create a class structure and relationships between classes, (2) controlling a computer to receive via invocation of one or more of the design tools displayed in step (1) input data from a designer of a user interface for a target computer program being modelled to select a class, (3) controlling a computer to receive via invocation of one or more of the design tools displayed in step (1) input data from a designer of a user interface for a target computer program being modelled to select of one or more Interface Units to define the type of user interface display said target computer program will display and interactivity which is to be provided in the desired user interface of said target computer program, each of said Interface Units defining a particular pattern for a user interface of said target computer program; and (4) controlling a computer to display dialog boxes or forms identifying which data is compulsory and inviting entry of at least said compulsory data which articulates said selected Interaction Unit and which objects from said selected class and which attribute data from selected objects will be displayed on said user interface of said target computer program or controlling how services defined by a selected Service Interface Unit can be interacted with in the user interface of said target computer program and how user interfaces created by said selected Service Interface Unit will behave in said desired user interface of said target computer program.

18. A process for validating a specification of a desired user interface for a target computer program being modeled, said specification being created in a formal language from selection and articulation of Interaction Units representing patterns of a user interface of a target computer program, and containing data structures which encode the type and content of user interface displays of said target computer program specified by said selected Interaction Units for one or more classes in said model, comprising the steps:

verifying that all mandatory names of all selected and named Interaction Units (IU) for each class are unique within said class;

verifying that all mandatory names of elemental patterns defined for each IU in each class are unique within said class;

verifying that all referenced objects in said IUs for each class exist;

verifying that each IU hierarchical action tree has a root node, a label, children nodes or reference to a target IU and no children;

verifying that all instance IUs and all population IUs for all classes have a reference to a mandatory existing display set;

verifying that all Master/Detail IUs for every class have at least one mandatory master component and at least one mandatory detail component;

verifying that all navigational formula expressions are valid according to the syntax of whatever formal language is in use;

verifying that all filter conditions in Population IUs of all classes have formulas and that the formulas defining said filters are valid according to the syntax for that type of formula of whatever formal language is in use;

verifying that every display set and every order criteria of every IU in every class which has a display set or order criteria has at least one element;

verifying that every navigation and action in every IU that has navigation and action specified has at least one element; and blocking automatic generation of code for said target computer program until all validation steps recited above have been performed and every statement in said formal language specification is complete and correct.

19. A computer readable medium having computer executable instructions stored thereon for controlling a computer to perform a method to validate a formal language specification of a user interface for a target computer program for which computer code is to be automatically generated, said formal language specification being created in a formal language from selection and articulation of Interaction Units representing patterns of a user interface of a target computer program, and containing data structures which encode the type and content of user interface displays of said target computer program specified by said selected Interaction Units for one or more classes in said model, said formal language being a language which has semantics wherein every term has one and only one meaning and each statement in said formal language has rules of syntax and semantics which can be used to validate said statement to ensure it is complete and correct, said method implemented by said computer-executable instructions comprising:

verifying that all mandatory names of all selected and named Interaction Units (IU) for each class are unique within said class;

verifying that all mandatory names of elemental patterns defined for each IU in each class are unique within said class;

verifying that all referenced objects in said IUs for each class exist;

verifying that each IU hierarchical action tree has a root node, a label, children nodes or reference to a target IU and no children;

verifying that all instance IUs and all population IUs for all classes have a reference to a mandatory existing display set;

verifying that all Master/Detail IUs for every class have at least one mandatory master component and at least one mandatory detail component;

verifying that all navigational formula expressions are valid according to the syntax of whatever formal language is in use;

verifying that all filter conditions in Population IUs of all classes have formulas and that the formulas defining said filters are valid according to the syntax for that type of formula of whatever formal language is in use;

verifying that every display set and every order criteria of every IU in every class which has a display set or order criteria has at least one element;

verifying that every navigation and action in every IU that has navigation and action specified has at least one element; and blocking automatic generation of code for said target computer program until all validation steps recited above have been performed and every statement in said formal language specification is complete and correct.

20. A computer programmed to carry out the following method to validate a formal language specification of a user interface for a target computer program defined by said formal language specification, said formal language specification being created in a formal language from selection and articulation of Interaction Units representing patterns of a user interface of said target computer program, and containing data structures which encode the type and content of user interface displays of said target computer program specified by said selected Interaction Units for one or more classes in said model, said formal language written in a formal language which has semantics in which every term has one and only one meaning and in which each statement has rules of syntax and semantics that can be used to validate said statement to ensure that statements in said formal language specification of said user interface of said target computer program are complete and correct, said method comprising the steps:

verifying that all mandatory names of all selected and named Interaction Units (IU) for each class are unique within said class;

verifying that all mandatory names of elemental patterns defined for each IU in each class are unique within said class;

verifying that all referenced objects in said IUs for each class exist;

verifying that each IU hierarchical action tree has a root node, a label, children nodes or reference to a target IU and no children;

verifying that all instance IUs and all population IUs for all classes have a reference to a mandatory existing display set;

verifying that all Master/Detail IUs for every class have at least one mandatory master component and at least one mandatory detail component;

verifying that all navigational formula expressions are valid according to the syntax of whatever formal language is in use;

verifying that all filter conditions in Population IUs of all classes have formulas and that the formulas defining said filters are valid according to the syntax for that type of formula of whatever formal language is in use;

verifying that every display set and every order criteria of every IU in every class which has a display set or order criteria has at least one element;

verifying that every navigation and action in every IU that has navigation and action specified has at least one element; and blocking automatic generation of code for said target computer program until all validation steps recited above have been performed and every statement in said formal language specification is complete and correct.

* * * * *